(12) United States Patent
Yoshida et al.

(10) Patent No.: US 8,974,065 B2
(45) Date of Patent: Mar. 10, 2015

(54) OPTICAL BODY, WALL MEMBER, FITTING, SOLAR SHADING DEVICE, AND BUILDING

(75) Inventors: Hironori Yoshida, Miyagi (JP); Tsutomu Nagahama, Miyagi (JP); Masashi Enomoto, Tokyo (JP)

(73) Assignee: Dexerials Corporation, Tokyo (JP)

( * ) Notice: Subject to any disclaimer, the term of this patent is extended or adjusted under 35 U.S.C. 154(b) by 679 days.

(21) Appl. No.: 13/155,610

(22) Filed: Jun. 8, 2011

(65) Prior Publication Data

US 2011/0310473 A1 Dec. 22, 2011

(30) Foreign Application Priority Data

Jun. 16, 2010 (JP) ................. P2010-137783

(51) Int. Cl.
*G02B 27/00* (2006.01)
*G02B 5/08* (2006.01)
*G02B 5/28* (2006.01)
*B32B 3/00* (2006.01)
*B05D 5/06* (2006.01)
(Continued)

(52) U.S. Cl.
CPC . *B32B 37/02* (2013.01); *B32B 3/30* (2013.01); *E06B 9/24* (2013.01); *G02B 5/0808* (2013.01); *B32B 38/06* (2013.01); *B32B 2037/243* (2013.01); *B32B 2037/246* (2013.01); *B32B 2307/416* (2013.01); *B32B 2309/02* (2013.01); *B32B 2309/12* (2013.01); *B32B 2310/0831* (2013.01); *B32B 2419/00* (2013.01); *B32B 2551/00* (2013.01); *E06B 2009/2417* (2013.01)
USPC ........... 359/601; 359/359; 359/589; 428/172; 427/162

(58) Field of Classification Search
USPC ......... 359/634, 318, 629, 529, 530, 537, 548, 359/533, 359, 360, 639, 601–602, 608–609, 359/589, 590; 428/172; 427/162, 163.4
See application file for complete search history.

(56) References Cited

U.S. PATENT DOCUMENTS

| | | | |
|---|---|---|---|
| 6,861,134 B1 * | 3/2005 | Peters .................. | 428/319.1 |
| 2005/0163971 A1 * | 7/2005 | Kobayashi et al. ........... | 428/156 |
| 2010/0177384 A1 * | 7/2010 | Peroz et al. .................. | 359/487 |

FOREIGN PATENT DOCUMENTS

| | | |
|---|---|---|
| JP | S-55-036525 | 8/1978 |
| JP | A-2002-508533 | 3/2002 |

(Continued)

OTHER PUBLICATIONS

Japanese Patent Office, Notification of Reason(s) for Refusal mailed on Feb. 12, 2014 in Japanese Patent Application No. 2010-137783 w/English-language Translation.

(Continued)

*Primary Examiner* — Dawayne A Pinkney
(74) *Attorney, Agent, or Firm* — Oliff PLC

(57) ABSTRACT

An optical body includes a substrate having a concave-convex surface, a reflecting layer formed on the concave-convex surface, and an optical layer formed on the reflecting layer to embed the concave-convex surface, wherein the reflecting layer directionally reflects light, the concave-convex surface is made up of a plurality of triangular pillars arrayed in a one-dimensional pattern, and the triangular pillar has an apex angle α and a slope angle β, the apex angle α and the slope angle β satisfying a formula (1) or (2) given below:

$$30 \leq \beta \leq 4.5\alpha - 285 (70 \leq \alpha \leq 80) \quad (1)$$

$$30 \leq \beta \leq -1.5\alpha + 195 (80 \leq \alpha \leq 100) \quad (2).$$

17 Claims, 30 Drawing Sheets

(51) Int. Cl.
    *B32B 37/02*      (2006.01)
    *B32B 3/30*      (2006.01)
    *E06B 9/24*      (2006.01)
    *B32B 38/06*      (2006.01)
    *B32B 37/24*      (2006.01)

(56) References Cited

FOREIGN PATENT DOCUMENTS

| | | |
|---|---|---|
| JP | 2006-322313 | 11/2006 |
| JP | A-2006-317648 | 11/2006 |
| JP | A-2006-322313 | 11/2006 |
| JP | A-2007-192016 | 8/2007 |
| WO | WO 99/31534 | 6/1999 |
| WO | WO 2007005357 A1 * | 1/2007 |
| WO | WO 2008049708 A1 * | 5/2008 |

OTHER PUBLICATIONS

Japanese Patent Office, Notification of Reason(s) for Refusal mailed Nov. 11, 2014 in Japanese Patent Application No. 2010-137783 w/English-language Translation.

* cited by examiner

WALL SIDE        ATMOSPHERE SIDE

INCIDENT LIGHT

INCIDENT LIGHT

INCIDENT LIGHT

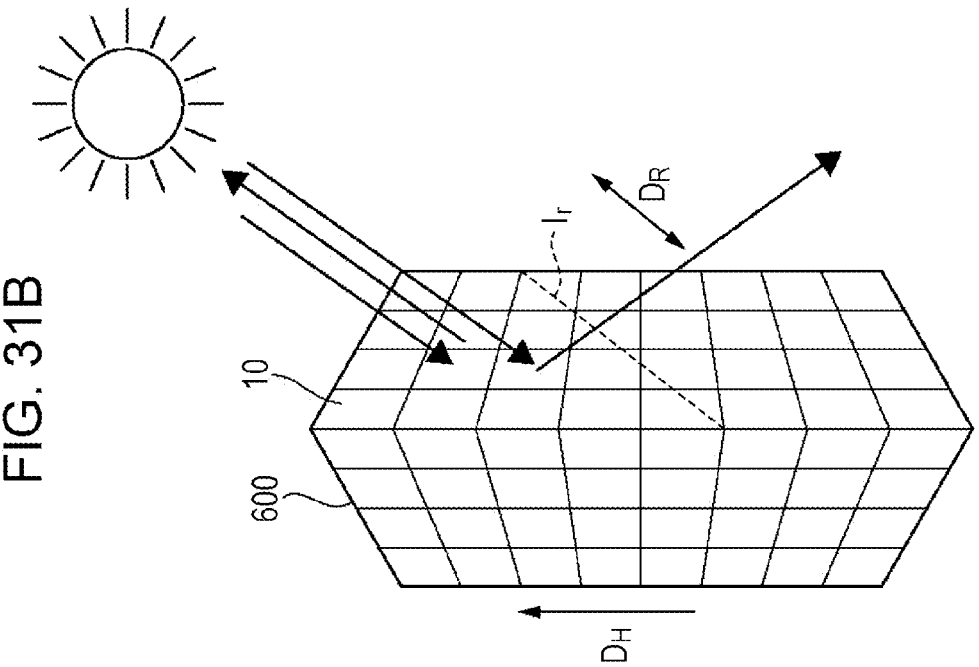
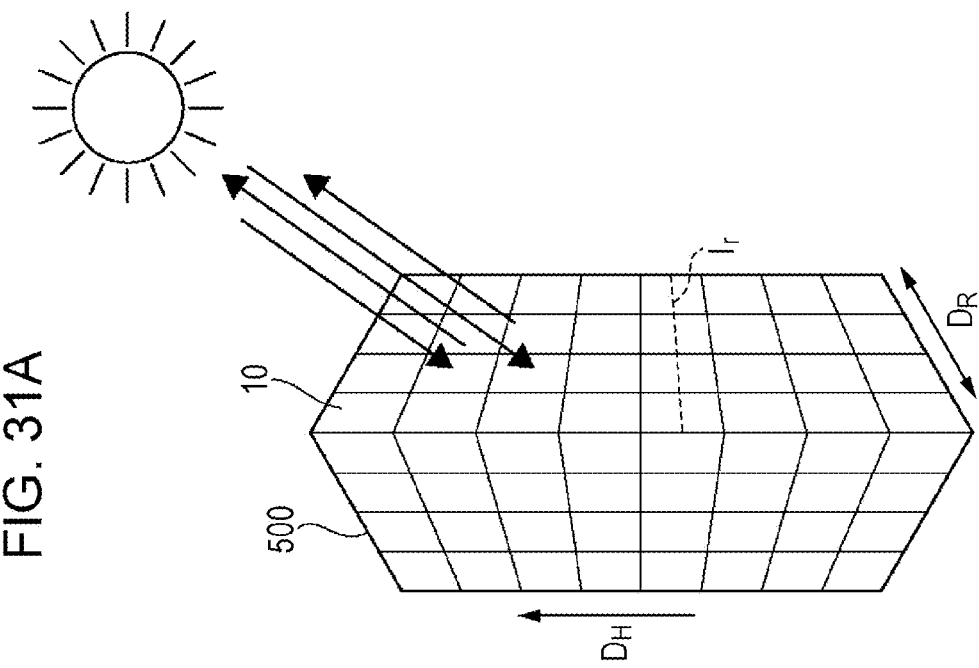

OPTICAL BODY, WALL MEMBER, FITTING, SOLAR SHADING DEVICE, AND BUILDING

CROSS REFERENCES TO RELATED APPLICATIONS

The present application claims priority to Japanese Priority Patent Application JP 2010-137783 filed in the Japan Patent Office on Jun. 16, 2010, the entire contents of which are hereby incorporated by reference.

BACKGROUND

The present application relates to an optical body, a wall member, a fitting, a solar shading device, and a building. More particularly, the present technology relates to an optical body for directionally reflecting incident light.

Recently, there have been increased the cases of coating layers to reflect the sunlight on wall surfaces of various buildings, such as high-rise buildings and housings. Such a trend represents one of energy-saving measures with the view of preventing global warming, and it is intended to reduce a load of cooling equipment for buildings, which load is increased with solar energy, i.e., the sunlight, being absorbed by the wall surfaces of the buildings and raising the temperature in the buildings.

Further, when the sunlight incoming from the sky and impinging against the wall surface of a building is specularly (regularly) reflected, the reflected light may reach other buildings and the ground in the nearby outside where the light is absorbed and converted to heat, thus raising the ambient temperature. Accordingly, a local temperature rise occurs in the surroundings of the building. This gives rise to the problems that, in urban areas, a heat island phenomenon is accelerated and grass does not grow in areas irradiated with the reflected light.

As one example of techniques of coating the layers for reflecting the sunlight on the wall surfaces of the buildings, there is proposed a technique of forming a reflecting layer on corner cubes such that incident light is retroreflected by the reflecting layer (see Japanese Unexamined Patent Application Publication No. 2006-322313).

SUMMARY

With the proposed technique mentioned above, the reflecting layer is formed on the corner cubes, and hence the sunlight can be retroreflected after the incident light has been reflected by the reflecting layer three times. However, because the incident light is reflected three times, the amount of light absorbed by the reflecting layer is increased about three times in comparison with that absorbed when the reflecting layer is formed on a flat plate, and the amount of heat generated is increased correspondingly. For that reason, when that type of optical body is applied to a wall member for a building, the temperature of the wall member may rise and the temperature in an inner space of the building may also rise. In such a case, the cooling equipment is operated at a higher utilization rate and the amount of $CO_2$ emission is increased.

It is, therefore, desirable to provide an optical body, a wall member, a fitting, a solar shading device, and a building, which can ensure high upward reflection performance, and which can reduce absorption of light by a reflecting layer.

According to one embodiment, there is provided an optical body including a substrate having a concave-convex surface, a reflecting layer formed on the concave-convex surface, and an optical layer formed on the reflecting layer to embed the concave-convex surface, wherein the reflecting layer directionally reflects light, the concave-convex surface is made up of a plurality of triangular pillars arrayed in a one-dimensional pattern, and the triangular pillar has an apex angle α and a slope angle β, the apex angle α and the slope angle β satisfying a formula (1) or (2) given below:

$$30 \le \beta \le 4.5\alpha - 285 \, (70 \le \alpha \le 80) \quad (1)$$

$$30 \le \beta \le -1.5\alpha + 195 \, (80 \le \alpha \le 100) \quad (2)$$

According to another embodiment, there is provided an optical body including a substrate having a concave-convex surface, and a reflecting layer formed on the concave-convex surface, wherein the reflecting layer directionally reflects light, the concave-convex surface is made up of a plurality of triangular pillars arrayed in a one-dimensional pattern, and the triangular pillar has an apex angle α and a slope angle β, the apex angle α and the slope angle β satisfying a formula (1) or (2) given below:

$$30 \le \beta \le 4.5\alpha - 285 \, (70 \le \alpha \le 80) \quad (1)$$

$$30 \le \beta \le -1.5\alpha + 195 \, (80 \le \alpha \le 100) \quad (2)$$

With the optical body according to the embodiment, the concave-convex surface is formed by arraying asymmetrical triangular pillars in a one-dimensional pattern, and the reflecting layer is formed on the concave-convex surface. Therefore, when the optical body according to the embodiment is applied to an adherend (i.e., an affixing target), such as a wall member, the incident light can be reflected upward.

Further, with the optical body according to the embodiment, the apex angle α and the slope angle β of the triangular pillar satisfy the predetermined relationship. Therefore, when the optical body according to the embodiment is applied to the adherend, such as the wall member, a high upward reflectance can be obtained.

According to the embodiments of the present technology, as described above, since heat generation caused with absorption of light is reduced in the optical body capable of directionally reflecting the incident light, energy saving can be realized. Further, when the optical body is applied to the adherend, such as the wall member, a high upward reflectance can be obtained Additional features and advantages are described herein, and will be apparent from the following Detailed Description and the figures.

BRIEF DESCRIPTION OF THE FIGURES

FIGS. 31A and 31B are illustrations to explain the difference in reflection function of the optical film depending on the direction of affixing of the optical film.

DETAILED DESCRIPTION

Embodiments of the present application will be described below in detail with reference to the drawings.

1. First embodiment (in which an optical film is formed by arraying asymmetrical triangular pillars in a one-dimensional pattern)

2. Second embodiment (in which a reflecting layer of an optical film is exposed on the side including one principal surface of the optical film)

3. Third embodiment (in which an optical film includes a self-cleaning effect layer)

4. Fourth embodiment (in which the optical film is applied to a window blind (shade))

5. Fifth embodiment (in which the optical film is applied to a rolling screen device)

6. Sixth embodiment (in which the optical film is applied to a fitting)

1. First Embodiment

Construction of Optical Film

Figure 1A:
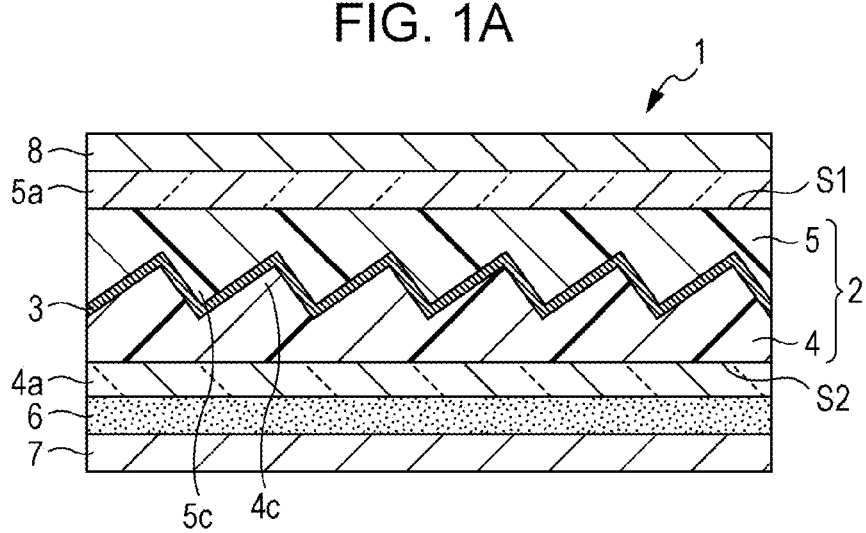
FIG. 1A is a sectional view illustrating one example of construction of an optical film according to a first embodiment.
Figure 1B:
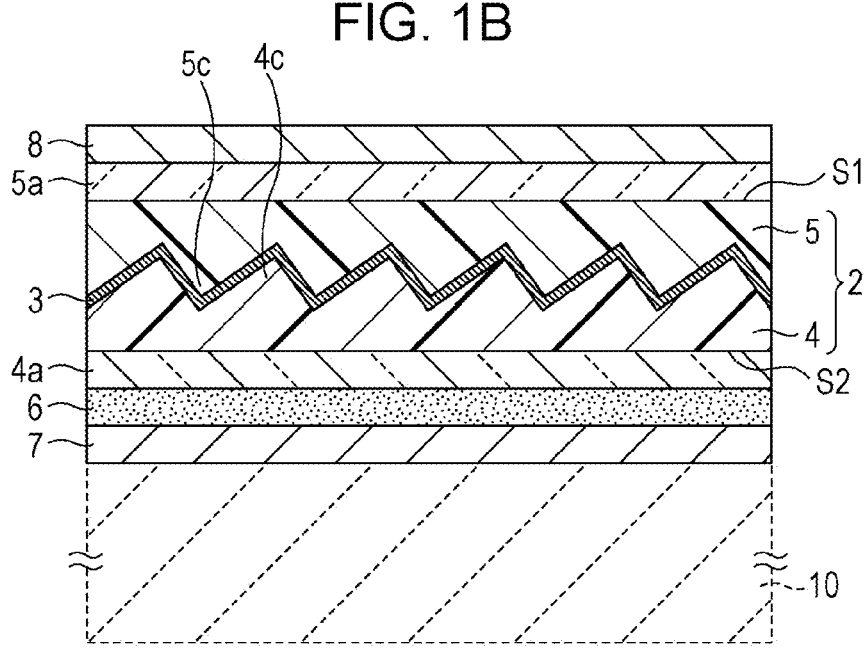
FIG. 1B is a sectional view illustrating an example in which the optical film according to the first embodiment is affixed to an adherend (affixing target)

FIG. 1A is a sectional view illustrating one example of construction of an optical film 1 according to a first embodiment, and FIG. 1B is a sectional view illustrating an example in which the optical film according to the first embodiment is affixed to an adherend (affixing target). The optical film 1, as one form of an optical body, is an optical film having the so-called directional reflective property. As illustrated in FIG. 1A, the optical film 1 includes an optical layer 2 having an interface formed therein in a concave-convex shape, and a reflecting layer 3 formed at the interface in the optical layer 2.

The optical layer 2 includes a first optical layer (substrate) 4 having a first surface in a concave-convex shape, and a second optical layer 5 having a second surface in a concave-convex shape. The interface in the optical layer 2 is formed by the first concave-convex surface and the second concave-convex surfaces, which are arranged to face each other. Stated another way, the optical film 1 includes the first optical layer 4 having a concave-convex surface, the reflecting layer 3 formed on the concave-convex surface of the first optical layer 4, and the second optical layer 5 formed on the reflecting layer 3 so as to embed the concave-convex surface on which the reflecting layer 3 is formed. The optical film 1 has an incident surface (first principal surface) S1 on which light, such as the sunlight, is incident, and a rear surface (second principal surface) S2 which is positioned on the opposite side to the incident surface S1. The optical film 1 is suitably applied to inner wall members, outer wall members, wall materials, and so on. Further, the optical film 1 is suitably applied to a slat (one example of a solar shading member) of a window blind (shade) and a screen (another example of the solar shading member) of a rolling screen device. Moreover, the optical film 1 is suitably employed as an optical body that is disposed in a shading portion of a fitting (i.e., an interior member or an exterior member), such as a shoji (i.e., a paper-made and/or glass-fitted sliding door).

The optical film 1 may further include a first base 4a, when necessary, on the rear surface S2 of the optical layer 2. The optical film 1 may further include a second base 5a, when necessary, on the incident surface S1 of the optical layer 2.

The optical film 1 may further include an affixing layer 6, when necessary. The affixing layer 6 is formed on one of the incident surface S1 and the rear surface S2 of the optical film 1, which one is to be affixed to the adherend, e.g., a wall member 10. Thus, the optical film 1 is affixed to the wall member 10, i.e., the adherend, with the affixing layer 6 interposed therebetween. The affixing layer 6 can be formed, for example, as a bonding layer containing a bond (e.g., a UV-cured resin or a two-liquid mixed resin) as a main component, or as an adhesive layer containing an adhesive (e.g., a PSA (Pressure Sensitive Adhesive)) as a main component. When the affixing layer 6 is the adhesive layer, a peel-off layer 7 is preferably further formed on the affixing layer 6. This enables the optical film 1 to be easily affixed, just by peeling off the peel-off layer 7, to the adherend, e.g., the wall member 10, with the affixing layer 6 interposed therebetween.

From the viewpoint of increasing adhesion between the second base 5a and one or both of the affixing layer 6 and the second optical layer 5, the optical film 1 may further include a primer layer (not shown) between the second base 5a and one or both of the affixing layer 6 and the second optical layer 5. Also, from the viewpoint of increasing adhesion at the above-mentioned location(s), it is preferable to carry out ordinary physical pretreatment instead of or in addition to forming the primer layer. The ordinary physical pretreatment includes, e.g., plasma treatment or corona treatment.

The optical film 1 may further include a barrier layer (not shown) on one of the incident surface S1 and the rear surface S2, or between that one surface and the reflecting layer 3. With the presence of the barrier layer, it is possible to reduce diffusion of moisture toward the reflecting layer 3 from the incident surface S1 or the rear surface S2 and to suppress deterioration of a metal, etc. contained in the reflecting layer 3. Accordingly, durability of the optical film 1 can be improved.

The optical film 1 may further include a hard coat layer 8 from the viewpoint of giving the surface of the optical film 1 with resistance against excoriation, scratching, etc. The hard coat layer 8 is preferably formed on one of the incident surface S1 and the rear surface S2 of the optical film 1, which one is positioned on the opposite side to the surface affixed to the adherend, e.g., the wall member 10. A water-repellent or hydrophilic layer may be further formed on the incident surface S1 of the optical film 1 from the viewpoint of providing an antifouling property, etc. The layer having such a function may be formed, for example, directly on the optical layer 2 or on one of various functional layers such as the hard coat layer 8.

The optical film 1 preferably has flexibility from the viewpoint of enabling the optical film 1 to be easily affixed to the adherend, e.g., the wall member 10. Herein, the term "film" is to be construed as including a sheet. In other words, the optical film 1 includes an optical sheet as well.

The second optical layer 5 preferably has transparency to the incident light. With the second optical layer 5 having transparency to the incident light, the incident light can be directionally reflected by the reflecting layer 3. Herein, the term "transparency" is defined as having two meanings, i.e., as not absorbing light and not scattering light. When the term "transparency" is generally used, it often implies the former meaning alone. However, the optical film 1 according to the first embodiment preferably has the transparency in both the meanings. One of the first optical layer 4 and the second optical layer 5, which one is positioned on the side affixed to, e.g., the wall member 10, may contain an adhesive as a main component. With such a feature, the optical film 1 can be affixed to, e.g., the wall member 10 by direct attachment of the first optical layer 4 or the second optical layer 5 that contains the adhesive as a main component.

The optical film 1 is used, for example, in such a way that it is affixed to the wall member 10 with, e.g., an adhesive interposed therebetween. Examples of the wall member 10 include architectural wall members for high-rise buildings, housings, etc. When the optical film 1 is applied to the architectural wall members, it is preferably applied to the wall member 10 that is oriented to face in some direction within a range, in particular, from east to south and further to west (e.g., within a range from southeast to southwest). This is because, by applying the optical film 1 to the wall member 10 oriented as mentioned above, the sunlight can be more effectively reflected.

Further, the optical film 1 can be used in combination with an additional heat-ray cutoff film. For example, a light absorption coating may be disposed at the interface between air and the optical film 1 (i.e., on the outermost surface of the optical film 1). Still further, the optical film 1 can be used in combination with a hard coat layer, an ultraviolet cutoff layer, a surface anti-reflection layer, etc. When one or more of those functional layers are used in a combined manner, the functional layer(s) is preferably disposed at the interface between the optical film 1 and air.

Depending on the usage of the optical film 1, the optical film 1 may be colored to have a visually attractive design. When the visually attractive design is given to the optical film 1, it is preferable that the second optical layer 5 absorbs primarily light in a particular wavelength band within the visible range to such an extent as not reducing transparency thereof.

Figure 2:
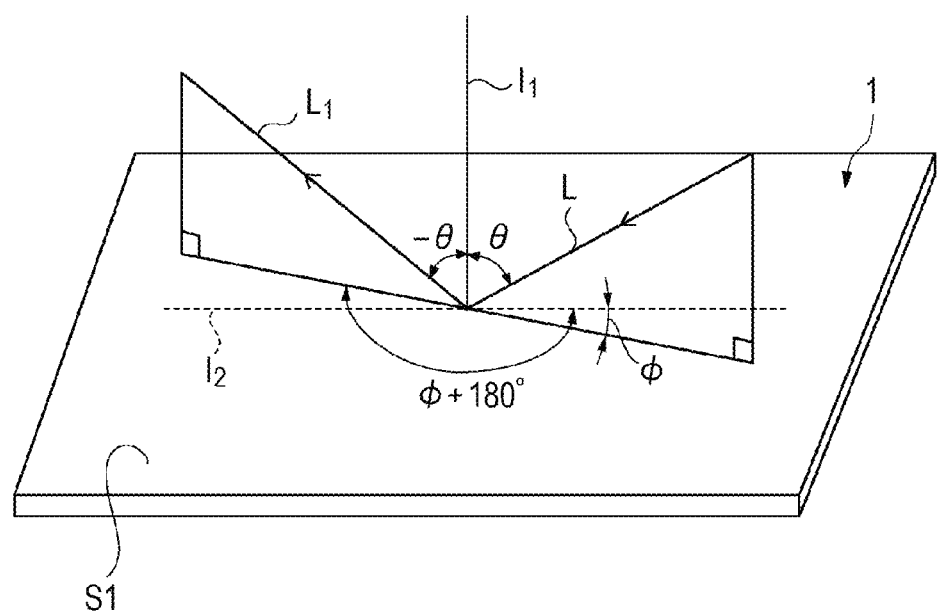
FIG. 2 is a perspective view illustrating the relationship between incident light that is incident on the optical film and reflected light that is reflected by the optical film.

FIG. 2 is a perspective view illustrating the relationship between incident light that is incident on the optical film 1 and reflected light that is reflected by the optical film 1. The optical film 1 has the incident surface S1 on which light L is incident. The optical film 1 selectively directionally reflects the light L entering the incident surface S1 at an incident angle $(\theta, \phi)$ in a direction other than a specular reflection direction (−θ, φ+180°). Herein, θ is an angle formed by a perpendicular line $l_1$ with respect to the incident surface S1 and the incident light L or reflected light $L_1$. Also, φ is an angle formed by a specific linear line $l_2$ in the incident surface S1 and a component resulting from projecting the incident light L or the reflected light $L_1$ to the incident surface S1. The specific linear line $l_2$ in the incident surface S1 implies an axis in which the reflection intensity is maximized in the direction φ when the optical film 1 is rotated about an axis provided by the perpendicular line $l_1$ with respect to the incident surface S1 of the optical film 1 while the incident angle (θ, φ) is held fixed (see FIGS. 3A and 3B). When there are plural axes (directions) in which the reflection intensity is maximized, one of those axes is selected as the linear line $l_2$. Further, an angle θ rotated clockwise from the perpendicular line $l_1$ as a reference is defined as "+θ", and an angle θ rotated counterclockwise from the perpendicular line $l_1$ is defined as "−θ". An angle φ rotated clockwise from the linear line $l_2$ as a reference is defined as "+φ", and an angle φ rotated counterclockwise from the linear line $l_2$ is defined as "−φ".

A direction φo in which the incident light is directionally reflected by the optical film 1 is preferably in the range of −90° or more to 90° or less. On such a condition, when the optical film 1 is affixed to the wall member 10, it can return the light incoming from the sky toward the sky. When there are no high-rise buildings in the surroundings, the optical film 1 directionally reflecting the incident light in the above-mentioned range is usefully employed. Further, the direction of the directional reflection is preferably in the vicinity of (θ, −φ). The expression "vicinity" implies that a deviation in the direction of the directional reflection is preferably within 5 degrees, more preferably within 3 degrees, and even more preferably within 2 degrees with respect to (θ, −φ). The reason is that, by setting the direction of the directional reflection as described above, when the optical film 1 is affixed to the wall member 10, it can efficiently return the light incoming from the sky above buildings standing side by side at substantially the same height toward the sky above the other buildings. In order to realize such directional reflection, the concave-convex surface of the first optical layer 4 or the second optical layer 5 is preferably formed by arraying triangular pillars, each extending in one direction, in a one-dimensional pattern. The light incoming in the direction (θ, φ) (−90°<φ<90°) can be reflected in a direction (θo, −φ) (0°<θo<90°) in accordance with a slope angle of the pillars.

The incident light is preferably directionally reflected by the optical film 1 in a direction in the vicinity of the direction of retroreflection. In other words, the direction of the reflection of the light incident on the incident surface S1 at the incident angle (θ, φ) is preferably in the vicinity of (θ, φ). The reason is that when the optical film 1 is affixed to the wall member 10, it can return the light incoming from the sky toward the sky. Herein, the expression "vicinity" implies that a deviation in the direction of the directional reflection is preferably within 5 degrees, more preferably within 3 degrees, and even more preferably within 2 degrees. By setting the direction of the directional reflection as described above, when the optical film 1 is affixed to the wall member 10, it can efficiently return the light incoming from the sky toward the sky. In the case of, e.g., an infrared sensor or an infrared image pickup device where an infrared light emitting unit and a light receiving unit are arranged adjacent to each other, the direction of retroreflection is to be set aligned with the incident direction. However, when sensing in a specific direction is not performed as in the embodiments of the present technology, the direction of retroreflection and the incident direction may be set not so exactly aligned with each other.

The first optical layer 4, the second optical layer 5, and the reflecting layer 3, which constitute the optical film 1, will be described in more detail below.

First Optical Layer and Second Optical Layer

The first optical layer 4 serves to, for example, support and protect the reflecting layer 3. The first optical layer 4 is made of a layer containing, e.g., a resin as a main component from the viewpoint of giving the optical film 1 with flexibility. For example, one of two principal surfaces of the first optical layer 4 is a smooth surface and the other is a concave-convex surface (first surface). The reflecting layer 3 is formed on the concave-convex surface of the first optical layer 4.

The second optical layer 5 serves to protect the reflecting layer 3 by embedding the first surface (concave-convex surface) of the first optical layer 4 on which the reflecting layer 3 is formed. The second optical layer 5 is made of a layer containing, e.g., a resin as a main component from the viewpoint of giving the optical film 1 with flexibility. For example, one of two principal surfaces of the second optical layer 5 is a smooth surface and the other is a concave-convex surface (second surface). The concave-convex surface of the first optical layer 4 and the concave-convex surface of the second optical layer 5 are reversed to each other in a concave-convex relation.

The second optical layer 5 has transparency to the incident light so that the incident light is directionally reflected by the reflecting layer 3. The second optical layer 5 may be transparent or opaque. Namely, it may be optionally transparent or opaque depending on the desired characteristics of the optical film 1.

The concave-convex surface of the first optical layer 4 is formed, for example, by a plurality of asymmetrical triangular pillars 4c that are arrayed in a one-dimensional pattern. The concave-convex surface of the second optical layer 5 is formed, for example, by a plurality of asymmetrical triangular pillars 5c that are arrayed in a one-dimensional pattern. Because the triangular pillars 4c of the first optical layer 4 and the triangular pillars 5c of the second optical layer 5 differ only in that the concave-convex relation is reversed to each other, the following description is made just about the triangular pillars 4c of the first optical layer 4.

In the optical film 1, an array pitch P of the triangular pillars 4c is preferably not smaller than 5 μm and not larger than 5 mm, more preferably not smaller than 5 μm and smaller than 250 μm, and even more preferably not smaller than 20 μm and not larger than 200 μm. If the array pitch P of the triangular pillars 4c is smaller than 5 μm, it is generally difficult to form the triangular pillars 4c in the desired shape. On the other hand, if the array pitch P of the triangular pillars 4c exceeds 5 mm, a necessary film thickness is increased and flexibility is lost from the optical film 1 when the shape of the triangular pillars 4c necessary for the directional reflection is taken into consideration, thus causing a difficulty in affixing the optical film 1 to a rigid body, such as the wall member 10. Further, by setting the array pitch P of the triangular pillars 4c to be smaller than 250 μm, flexibility is increased to such an extent that the optical film 1 can be easily manufactured in a roll-to-roll manner and batch production is not necessary. When the optical body (film) according to the embodiment is applied to building components such as wall members, a length of about several meters is necessary for the optical body (film) and roll-to-roll production is more suitable than the batch production. By setting the array pitch P to be not smaller than 20 μm and not larger than 200 μm, productivity can be further increased.

The shape of the triangular pillars 4c formed on the surface of the first optical layer 4 is not limited to one type, and the triangular pillars 4c may be formed in plural shapes on the surface of the first optical layer 4. When the triangular pillars 4c are formed in plural shapes on the surface of the first optical layer 4, a predetermined pattern including the plural shapes of the triangular pillars 4c may be cyclically repeated. As an alternative, the plural shapes of the triangular pillars 4c may be formed at random (non-cyclically) depending on the desired characteristics.

Figure 3A:
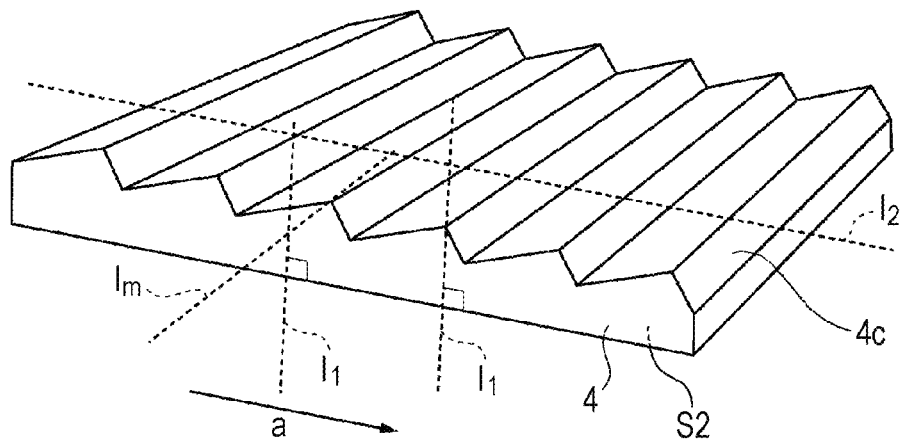
FIG. 3A is a perspective view illustrating an example of shape of triangular pillars formed in a first optical layer.
Figure 3B:
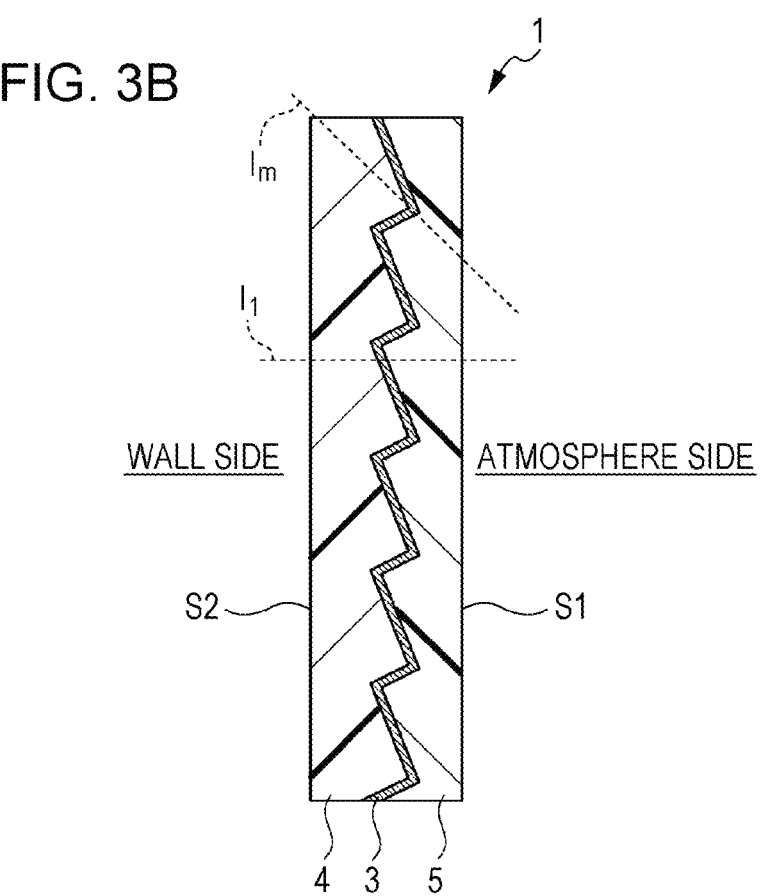
FIG. 3B is a sectional view illustrating an example of construction of the optical film including the first optical layer in which the triangular pillars illustrated in FIG. 3A are formed.

FIGS. 3A is a perspective view illustrating an example of shape of the triangular pillars formed in the first optical layer, and FIG. 3B is a sectional view illustrating an example of construction of the optical film including the first optical layer in which the triangular pillars illustrated in FIG. 3A are formed. The triangular pillars 4c are each in the form of an asymmetrical triangular pillar extending in one direction. The triangular pillars 4c are arrayed side by side in one direction, i.e., in a one-dimensional pattern. With the triangular pillar 4c having such a shape, the incident light can be returned toward the sky after being reflected once or twice. Accordingly, in comparison with the case of using corner cubes where the incident light is returned to the sky after being reflected three times, the amount of light absorbed by the reflecting layer 3 can be reduced and heat generation can be suppressed. Since the reflecting layer 3 is formed on the triangular pillars 4c, the reflecting layer 3 has the same shape as the surface shape of the triangular pillars 4c.

As illustrated in FIG. 3A, the triangular pillars 4c are each a triangular pillar having an asymmetrical shape with respect to a line $l_1$ perpendicular to the incident surface S1 or the rear surface S2 of the optical film 1. In such a case, a principal axis $l_m$ of the triangular pillar 4c is inclined from the perpendicular line $l_1$ as a reference in a direction a in which the triangular pillars 4c are arrayed side by side. Herein, the principal axis $l_m$ of the triangular pillar 4c represents a linear line passing a midpoint of a bottom side of the triangular pillar and an apex of the triangular pillar in a cross-section thereof. When the optical film 1 is affixed to the wall member 10 arranged substantially vertically to the ground, the principal axis $l_m$ of the triangular pillar 4c is inclined to the upward side (sky side) or the downward side (ground side) of the wall member 10 from the perpendicular line $l_1$ as a reference. In the example illustrated in FIG. 3B, the principal axis $l_m$ of the triangular pillar 4c is inclined to the downward side (ground side) of the wall member 10 from the perpendicular line $l_1$ as a reference.

Figure 4A:
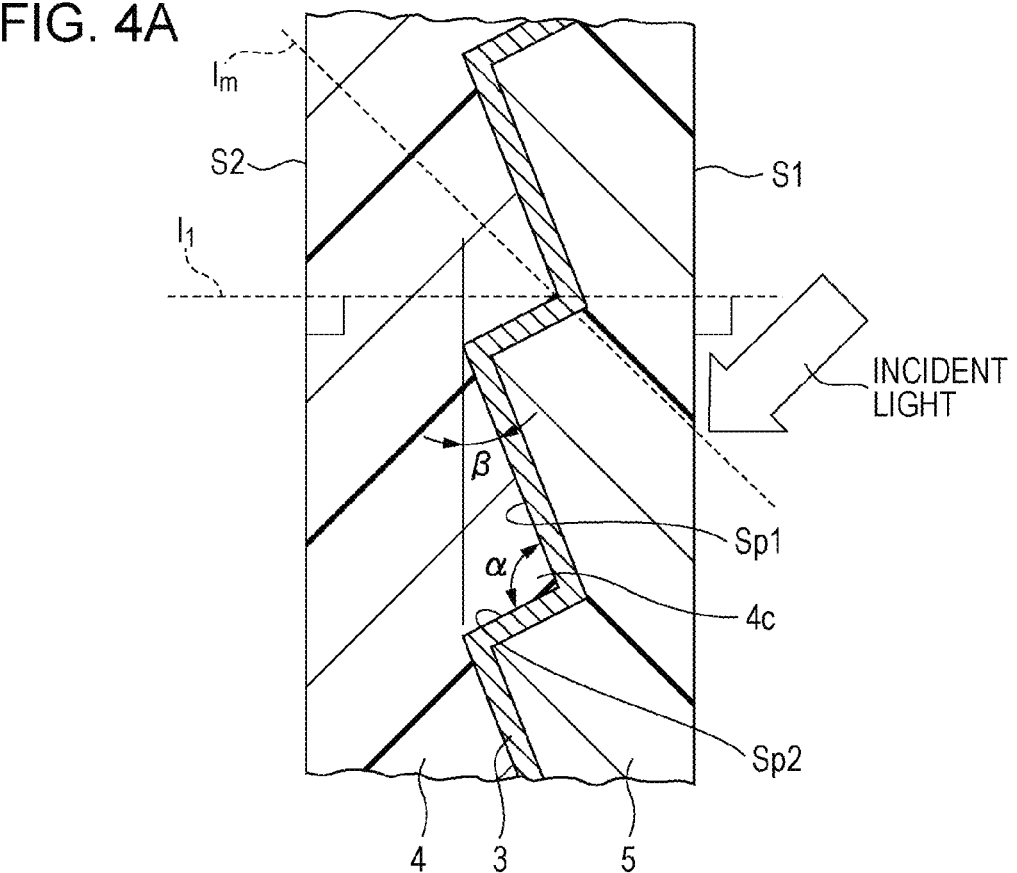
FIG. 4A is an enlarged sectional view illustrating, in enlarged scale, a part of the optical film illustrated in FIG. 3B.
Figure 4B:
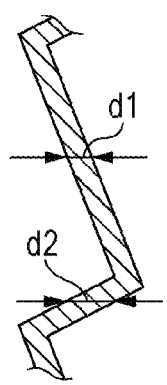
FIG. 4B is an enlarged sectional view illustrating, in enlarged scale, a reflecting layer illustrated in FIG. 3B.

FIG. 4A is an enlarged sectional view illustrating, in enlarged scale, a part of the optical film illustrated in FIG. 3B, and FIG. 4B is an enlarged sectional view illustrating, in enlarged scale, the reflecting layer illustrated in FIG. 3B. The triangular pillar 4c has a first sloped surface Sp1 and a second sloped surface Sp2 each providing a triangular pillar surface, i.e., a film-formed surface, on which the reflecting layer 3 is formed. When the optical film 1 is affixed to the adherend, e.g., the wall member 10, the first sloped surface Sp1 becomes a surface directing the upward side (sky side), and the second sloped surface Sp2 becomes a surface directing the downward side (ground side). In the following description, film thicknesses of the reflecting layer 3 formed on the first sloped surface Sp1 and the second sloped surface Sp2 are called a first film thickness d1 and a second film thickness d2 of the reflecting layer 3, respectively.

The triangular pillar 4c has an apex angle a that is formed by the first sloped surface Sp1 and the second sloped surface Sp2, and a slope angle β of the first sloped surface Sp1 with respect to the incident surface Si or the rear surface S2. The slope angle β provides a slope angle at which the optical film 1 is inclined to the upward side (sky side) when the optical film 1 is affixed to the adherend, e.g., the wall member 10. The optical film 1 is affixed to the adherend, e.g., the wall member 10 or a building, in such a state that the slope angle β of the triangular pillar 4c is positioned upward of the apex angle a thereof. The apex of the triangular pillar 4c may be rounded to have a curvature radius R. When an apex portion of the triangular pillar 4c is rounded to have a curvature radius R, the apex angle α is defined as an opening angle formed by two sides (sloped surfaces) at a position just before the apex portion is curved (rounded) at the curvature radius R.

The apex angle α and the slope angle β satisfy the following formula (1) or (2) and preferably the following formula (3) or (4). By satisfying one of those formulae, a higher upward reflectance can be obtained.

$$30 \le \beta \le 4.5\alpha - 285 (70 \le \alpha \le 80) \quad (1)$$

$$30 \le \beta \le -1.5\alpha + 195 (80 \le \alpha \le 100) \quad (2)$$

$$30 \le \beta \le \alpha - 40 (70 \le \alpha \le 80) \quad (3)$$

$$30 \le \beta \le -\alpha + 150 (80 \le \alpha \le 100) \quad (4)$$

The first film thickness d1 and the second film thickness d2 are preferably substantially the same. However, the first film thickness d1 and the second film thickness d2 may differ from each other as long as the following condition is satisfied. Herein, the expression "substantially the same" implies that a proportion of the first film thickness d1 to the second film thickness d2, i.e., $((d1/d2) \times 100)$ [%], is ±20% or less. On such a condition, because reflection performances of both the sloped surfaces are almost equal, it is possible to solve not only the problem of light transmission caused by the fact that the film is too thin, but also the problem of color floating caused by the fact that the film is too thick. When the first film thickness d1 and the second film thickness d2 differ from each other, smaller one of the first film thickness d1 and the second film thickness d2 is preferably 10 nm or more and more preferably 20 nm or more. If the smaller film thickness is less than 10 nm, performance of total reflection is degraded and the upward reflectance is reduced.

The first optical layer 4 preferably contains, as a main component, a resin of the type exhibiting a small reduction in its storage (elastic) modulus at 100° C. and not providing a significant difference in storage modulus between 25° C. and 100° C. In more detail, the first optical layer 4 preferably contains a resin having the storage modulus of $3 \times 10^9$ Pa or less at 25° C. and the storage modulus of $3 \times 10^7$ Pa or more at 100° C. The first optical layer 4 is preferably made of one type of resin, but it may contain two or more types of resins. Further, the first optical layer 4 may be mixed with an additive, when necessary.

When the first optical layer 4 contains, as a main component, the resin of the type exhibiting a small reduction in its storage modulus at 100° C. and not providing a significant difference in storage modulus between 25° C. and 100° C. as described above, the first optical layer 4 can substantially maintain the interface shape as per design even when a process under application of heat or both of heat and pressure is carried out after forming the concave-convex surface (first surface) of the first optical layer 4. On the other hand, if the first optical layer 4 contains, as a main component, a resin of the type exhibiting a large reduction in its storage modulus at 100° C. and providing a significant difference in storage modulus between 25° C. and 100° C., the interface shape is deformed from the designed shape to such a large extent that the optical film 1 may be curled.

The process under application of heat includes not only a process of directly applying heat to the optical film 1 or components thereof, such as annealing, but also a process in which temperature at the surface of a formed film is locally raised and heat is indirectly applied to the film surface, for example, during formation of a thin film and during curing of a resin composition, and a process in which the temperature of a mold (die) is raised upon irradiation with an energy ray and heat is indirectly applied to the optical film. Further, the effect resulting from restricting the numerical range of the storage modulus as described above is not limited to the case using the particular type of resin and can be similarly obtained when a thermoplastic resin, a thermosetting resin, and an energy-ray irradiation resin are used.

The storage modulus of the first optical layer 4 can be confirmed, for example, as follows. When the surface of the first optical layer 4 is exposed, the storage modulus of the first optical layer 4 can be confirmed by measuring the storage modulus of the exposed surface with a micro-hardness tester. When the first base 4a, etc. are formed on the surface of the first optical layer 4, the storage modulus of the first optical layer 4 can be confirmed by peeling off the first base 4a, etc. to make the surface of the first optical layer 4 exposed, and then measuring the storage modulus of the exposed surface with a micro-hardness tester.

A reduction in the storage modulus at high temperatures can be suppressed, for example, by a method of adjusting, e.g., the length and the kind of a side chain when the thermoplastic resin is used, and by a method of adjusting, e.g., the number of cross-linking points and the molecular structure of a cross-linking agent when the thermosetting resin or the energy-ray irradiation resin is used. However, it is preferable that the characteristics demanded for the resin material itself are not degraded with such a structural change. Depending on the type of the cross-linking agent, for example, the storage modulus at about room temperature may be increased to such an extent that a resin film becomes brittle, or that the resin film is curved or curled due to large shrinkage. It is, therefore, preferable to properly select the type of the cross-linking agent depending on the demanded characteristics.

When the first optical layer 4 contains a crystalline high-polymeric material as a main component, it preferably contains, as a main component, a resin having the glass transition point higher than a maximum temperature during a manufacturing process and exhibiting a small reduction in the storage modulus at the maximum temperature during the manufacturing process. On the other hand, if a resin having the glass transition point in the range of the room temperature 25° C. to the maximum temperature during the manufacturing process and exhibiting a large reduction in the storage modulus at the maximum temperature during the manufacturing process is used, a difficulty occurs in maintaining the ideal interface shape as per design during the manufacturing process.

When the first optical layer 4 contains a non-crystalline (amorphous) high-polymeric material as a main component, it preferably contains, as a main component, a resin having the melting point higher than the maximum temperature during the manufacturing process and exhibiting a small reduction in the storage modulus at the maximum temperature during the manufacturing process. On the other hand, if a resin having the melting point in the range of the room temperature 25° C. to the maximum temperature during the manufacturing process and exhibiting a large reduction in the storage modulus at the maximum temperature during the manufacturing process is used, a difficulty occurs in maintaining the ideal interface shape as per design during the manufacturing process.

Herein, the expression "maximum temperature during the manufacturing process" implies a maximum temperature at the concave-convex surface (first surface) of the first optical layer 4 during the manufacturing process. Preferably, the second optical layer 5 also satisfies the above-mentioned numerical range of the storage modulus and the above-mentioned temperature range of the glass transition point.

Thus, at least one of the first optical layer 4 and the second optical layer 5 preferably contains the resin having the storage modulus of $3 \times 10^9$ Pa or less at 25° C. On such a condition, the optical film 1 can be given with flexibility at the room temperature 25° C. and can be manufactured with the roll-to-roll process.

The first base 4a and the second base 5a have transparency in an exemplary case. Each base is preferably in the form of a film from the viewpoint of giving the optical film 1 with flexibility, but the form of the base is not particularly limited to the film. The first base 4a and the second base 5a can be each formed by using, e.g., general high-polymeric materials. Examples of the general high-polymeric materials include triacetylcellulose (TAC), polyester (TPEE), polyethylene terephthalate (PET), polyimide (PI), polyamide (PA), aramid, polyethylene (PE), polyacrylate, polyethersulfone, polysulfone, polypropylene (PP), diacetyl cellulose, polyvinyl chloride, acrylic resin (PMMA), polycarbonate (PC), epoxy resin, urea resin, urethane resin, and melamine resin. However, the materials of the first base 4a and the second base 5a are not limited to the above-mentioned particular examples. The thickness of each of the first base 4a and the second base 5a is preferably 38 to 100 μm from the viewpoint of productivity, but it is not limited to such a particular range. The first base 4a or the second base 5a is preferably transmissive to an energy ray. The reason is that when the first base 4a or the second base 5a is transmissive to an energy ray, an energy-ray curable resin interposed between the first base 4a or the second base 5a and the reflecting layer 3 can be cured, as described later, by irradiating the energy-ray curable resin with the energy ray from the side including the first base 4a or the second base 5a.

The first optical layer 4 and the second optical layer 5 have transparency in an exemplary case. The first optical layer 4 and the second optical layer 5 are each obtained, for example, by curing a resin composition. As the resin composition, an energy-ray curable resin capable of being cured upon irradiation with light or an electron beam, or a thermosetting resin capable of being cured upon application of heat is preferably used from the viewpoint of easiness in production. As the energy-ray curable resin, a photosensitive resin composition capable of being cured upon irradiation with light is preferable, and an ultraviolet curable resin composition capable of being cured upon irradiation with an ultraviolet ray is most preferable. From the viewpoint of increasing adhesion between the first optical layer 4 or the second optical layer 5 and the reflecting layer 3, the resin composition preferably further contains a compound containing phosphoric acid, a compound containing succinic acid, and a compound containing butyrolactone. The compound containing phosphoric acid may be, e.g., (meth)acrylate containing phosphoric acid, preferably a (meth)acryl monomer or oligomer having phosphoric acid in a functional group. The compound containing succinic acid may be, e.g., (meth)acrylate containing succinic acid, preferably a (meth)acryl monomer or oligomer having succinic acid in a functional group. The compound containing butyrolactone may be, e.g., (meth)acrylate containing butyrolactone, preferably a (meth)acryl monomer or oligomer having butyrolactone in a functional group.

The ultraviolet curable resin composition contains, e.g., (meth)acrylate and a photopolymerization initiator. The ultraviolet curable resin composition may further contain, when necessary, a photo-stabilizer, a flame retardant, a leveling agent, and/or an anti-oxidant.

As the acrylate, a monomer and/or an oligomer having two or more (meth)acryloyl groups is preferably used. Examples of such a monomer and/or oligomer include urethane (meth) acrylate, epoxy (meth)acrylate, polyester (meth)acrylate, polyol (meth)acrylate, polyether (meth)acrylate, and melamine (meth)acrylate. Herein, the term "(meth)acryloyl group" implies an acryloyl group or a methacryloyl group. The term "oligomer" used herein implies a molecule having molecular weight of 500 or more to 60000 or less.

The photopolymerization initiator used here can be selected, as appropriate, from among general materials. As examples of the general materials, benzophenone derivatives, acetophenone derivatives, anthraquinone derivatives, etc. can be used alone or in combination. An amount of the photopolymerization initiator mixed is preferably 0.1% by mass or more and 10% by mass or less of the solid content. If the amount of the photopolymerization initiator mixed is less than 0.1% by mass, photo-curability is reduced to such a level as being not suitable for industrial production from the practical point of view. On the other hand, if the amount of the photopolymerization initiator mixed exceeds 10% by mass, an odor tends to remain in a formed coating when an amount of light emitted for the irradiation is insufficient. Herein, the term "solid content" implies all components constituting the first optical layer 4 or the second optical layer 5 after being cured. The solid content includes, for example, the acrylate, the photopolymerization initiator, etc.

Preferably, the resin has such a property that a structure can be transferred to the resin upon, e.g., irradiation with the energy ray or application of heat. Any type of resin, including a vinyl-based resin, an epoxy-based resin, a thermoplastic resin, etc., can be used as long as the resin satisfies the above-described requirements for the refractive index.

The resin may be mixed with an oligomer to reduce curing shrinkage. The resin may further contain, e.g., polyisocyanate as a curing agent. In consideration of adhesion between the first optical layer 4 or the second optical layer 5 and the adjacent layer, the resin may be further mixed with suitable one or more of monomers having a hydroxyl group, a carboxyl group and a phosphoric group; polyols; coupling agents such as carboxylic acid, silane, aluminum and titanium; and various chelating agents.

The resin composition preferably further contains a cross-linking agent. In particular, a cyclic cross-linking agent is preferably used as the cross-linking agent. By using the cross-linking agent, the resin can be made heat-resistant without greatly changing the storage modulus at the room temperature. If the storage modulus at the room temperature is greatly changed, the optical film 1 may become brittle and a difficulty may occur in fabricating the optical film 1 with the roll-to-roll process. Examples of the cyclic cross-linking agent include dioxaneglycol diacrylate, tricyclodecanedimethanol diacrylate, tricyclodecanedimethanol dimethacrylate, ethylene oxide-modified isocyanurate diacrylate, ethylene oxide-modified isocyanurate triacrylate, and caprolactone-modified tris(acryloxyethyl) isocyanurate.

Preferably, the first base 4a or the second base 5a has water vapor permeability lower than that of the first optical layer 4 or the second optical layer 5, respectively. For example, when the first optical layer 4 is formed by using the energy-ray curable resin, e.g., urethane acrylate, the first base 4a is preferably formed by using a resin having water vapor permeability lower than that of the first optical layer 4 and being transmissive to the energy ray, e.g., polyethylene terephthalate (PET). As a result, diffusion of moisture into the reflecting layer 3 from the incident surface S1 or the rear surface S2 can be reduced and deterioration of a metal, etc. contained in the reflecting layer 3 can be suppressed. Hence, durability of the optical film 1 can be improved. Note that the water vapor permeability of PET having a thickness of 75 μm is about 10 g/m$^2$/day (40° C., 90% RH).

Preferably, at least one of the first optical layer 4 and the second optical layer 5 contains a functional group having high polarity, and the content of such a functional group differs between the first optical layer 4 and the second optical layer 5. More preferably, both the first optical layer 4 and the second optical layer 5 contain a phosphoric compound (e.g., phosphoric ester), and the content of the phosphoric compound differs between the first optical layer 4 and the second optical layer 5. The difference in the content of the phosphoric compound between the first optical layer 4 and the second optical layer 5 is preferably two or more times, more preferably five or more times, and even more preferably ten or more times.

When at least one of the first optical layer 4 and the second optical layer 5 contains the phosphoric compound, the reflecting layer 3 preferably contains an oxide, a nitride, or an oxynitride in its surface contacting with the first optical layer 4 or the second optical layer 5 that contains the phosphoric compound. It is particularly preferable that the reflecting layer 3 includes a layer, which contains zinc oxide (ZnO) or niobium oxide, in its surface contacting with the first optical layer 4 or the second optical layer 5 that contains the phosphoric compound. Such a feature is effective in increasing adhesion between the first optical layer 4 or the second optical layer 5 and the reflecting layer 3. Another reason is that an anticorrosion effect is increased when the reflecting layer 3 contains a metal, such as Ag. Additionally, the reflecting layer 3 may contain a dopant, such as Al or Ga. The reason is that the dopant improves film quality and smoothness when a metal oxide layer is formed by, e.g., sputtering.

From the viewpoint of giving the optical film 1, the wall member 10, etc. with a visually attractive design, at least one of the first optical layer 4 and the second optical layer 5 preferably has a characteristic of absorbing light in a particular wavelength band within the visible range. A pigment dispersed in the resin may be either an organic pigment or an inorganic pigment. In particular, an inorganic pigment having high weatherbility in itself is preferable. Practical examples of the inorganic pigment include zircone gray (Co- and Ni-doped $ZrSiO_4$), praseodymium yellow (Pr-doped $ZrSiO_4$), chrome-titania yellow (Cr- and Sb-doped $TiO_2$ or Cr- and W-doped $TiO_2$), chrome green (such as $Cr_2O_3$), peacock blue ((CoZn)O(AlCr)$_2O_3$), Victoria green ((Al, Cr)$_2O_3$), deep blue (CoO.$Al_2O_3$.$SiO_2$), vanadium-zirconium blue (V-doped $ZrSiO_4$), chrome-tin pink (Cr-doped CaO.$SnO_2$.$SiO_2$), manganese pink (Mn-doped $Al_2O_3$), and salmon pink (Fe-doped $ZrSiO_4$). Examples of the organic pigment include an azo-based pigment and a phthalocyanine pigment.

Reflecting Layer

The reflecting layer 3 is, for example, a highly reflecting layer that directionally reflects the light L entering the incident surface S1 at the incident angle (θ, φ) in a direction other than the specular reflection direction (−θ, φ+180°) (see FIG. 2). The reflecting layer 3 is formed of, e.g., a metal film having a high reflectance that is preferably 30% or more at a wavelength of 1500 nm. The reflecting layer 3 may contain, as a main material component, Au, Ag, Cu, Al, Ni, Cr, Ti, Pd, Co, Si, Ta, W, Mo or Ge alone, or an alloy containing two or more selected from among those elements, for example. Of those examples, Ag-, Cu-, Al-, Si- or Ge-based materials are preferable in consideration of practicability. To retard corrosion of the reflecting layer 3, an additional material, such as Ti or Nd, is preferably mixed in the metal layer. Further, a metal nitride layer can be made of, e.g., TiN, CrN or WN. A film thickness of the reflecting layer 3 can be set to the range of, e.g., 10 nm or more to 200 nm or less. However, the film thickness of the reflecting layer 3 is not limited to that range as long as a high reflectance is obtained.

Function of Optical Film

Figure 5A:
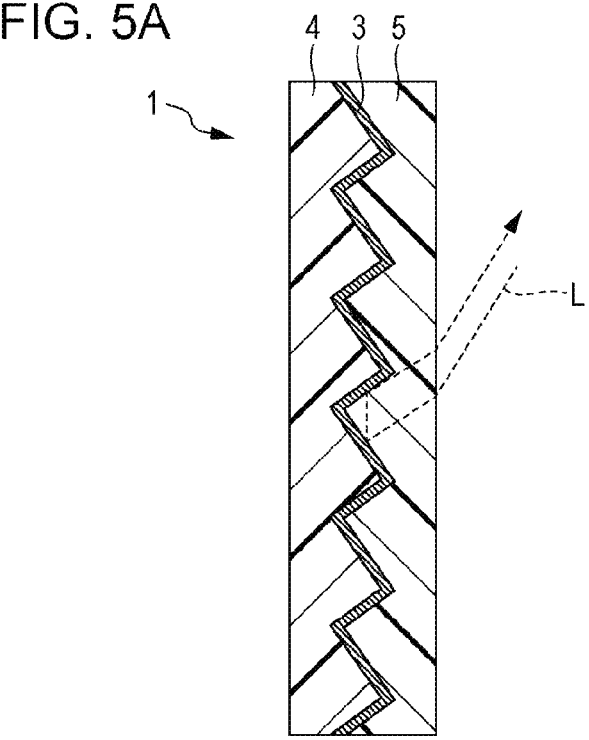
FIGS. 5A and 5B are each a sectional view to explain one example of function of the optical film according to the first embodiment.
Figure 5B:
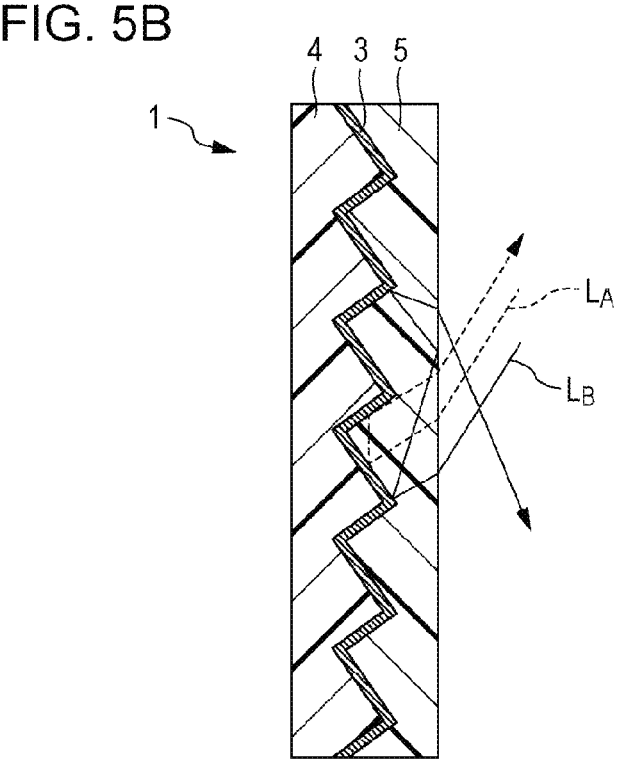

FIGS. 5A and 5B are each a sectional view to explain one example of function of the optical film. As illustrated in FIG. 5A, the sunlight L entering the optical film 1 is directionally reflected by the reflecting layer 3 toward the sky in a substantially reversed relation, for example, in a direction almost reversed to the direction of the incident light.

Further, as illustrated in FIG. 5B, the light entering the optical film 1 and reflected by the reflecting surface of the reflecting layer 3 is separated into a component $L_A$ reflected toward the sky and a component $L_B$ not reflected toward the sky at a proportion depending on the incident angle. The component $L_B$ not reflected toward the sky is totally reflected at the interface between the second optical layer 5 and air and is then finally reflected in a direction differing from the incident direction.

Figure 6A:
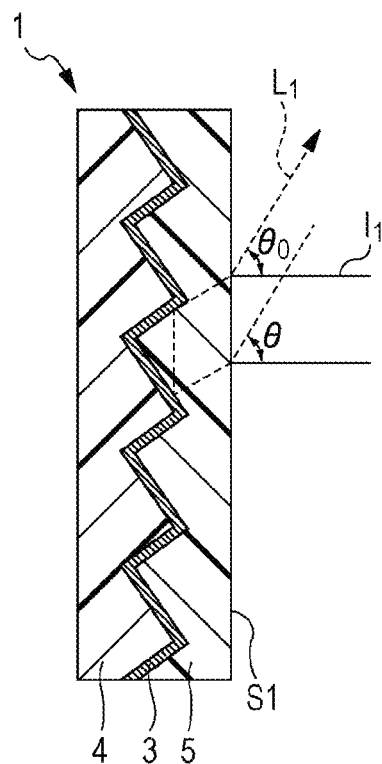
FIGS. 6A is a sectional view to explain one example of function of the optical film according to the first embodiment.
Figure 6B:
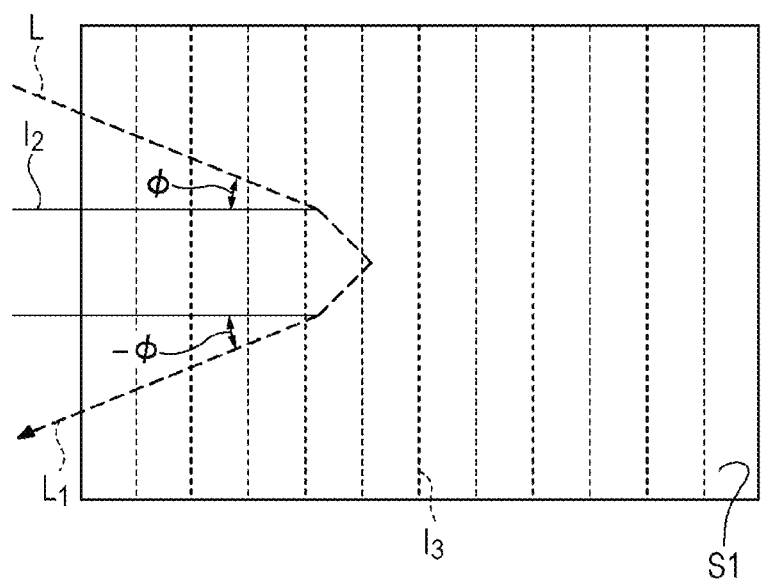
FIG. 6B is a plan view to explain one example of function of the optical film according to the first embodiment.

FIGS. 6A and 6B illustrate the relationship among a ridgeline $l_3$ of the triangular pillar 4c, the incident light L, and the reflected light $L_1$. It is preferable that the optical film 1 selectively directionally reflects the light L entering the incident surface S1 at an incident angle $(\theta, \phi)$ in a direction $(\theta_0, -\phi)$ $(0°<\theta_0<90°)$. By satisfying that relationship, the optical film 1 can reflect the incident light toward the sky. Herein, $\theta$ is an angle formed by a perpendicular line $l_1$ with respect to the incident surface S1 and the incident light L or the reflected light $L_1$. Also, is an angle formed in the incident surface S1 by a linear line $l_2$, which is orthogonal to the ridgeline $l_3$ of the triangular pillar 4c, and a component resulting from projecting the incident light L or the reflected light $L_1$ to the incident surface S1. Further, an angle $\theta$ rotated clockwise from the perpendicular line $l_1$ as a reference is defined as "+$\theta$", and an angle $\theta$ rotated counterclockwise from the perpendicular line $l_1$ is defined as "−$\theta$". An angle rotated clockwise from the linear line $l_2$ as a reference is defined as "+$\phi$", and an angle rotated counterclockwise from the linear line $l_2$ is defined as "−$\phi$".

Entire Shape of Optical Film

Figure 29:
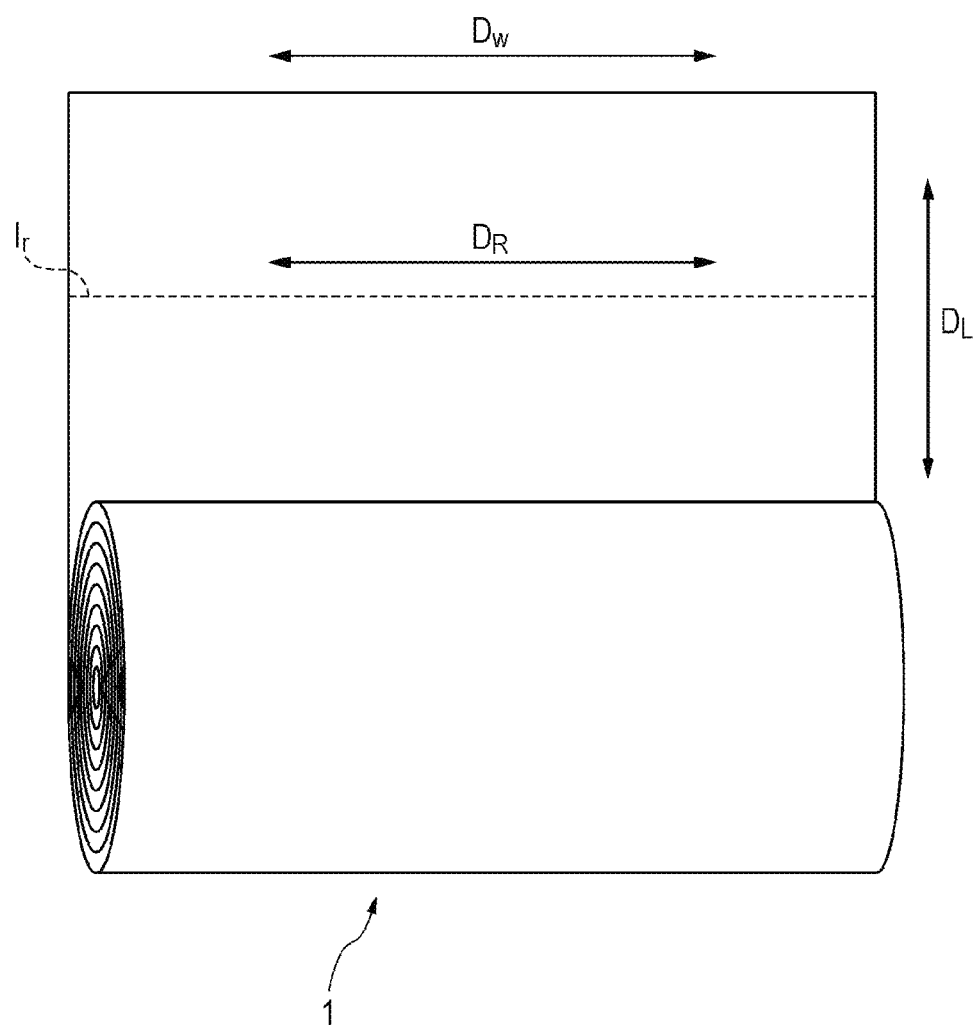
FIG. 29 is a perspective view illustrating one example of an entire shape of the optical film according to the first embodiment.

FIG. 29 is a perspective view illustrating one example of an entire shape of the optical film according to the first embodiment. As illustrated in FIG. 29, the optical film 1 preferably has a belt-like shape or a rectangular shape in its entirety. With the optical film 1 having such a shape, the optical film 1 can be easily fabricated with the roll-to-roll process. Further, by winding the optical film 1 into the form of a roll, it becomes easier to handle the optical film 1. In the following description, the lengthwise (longitudinal) direction of the optical film 1 having the belt-like shape or the rectangular shape is called a "lengthwise direction $D_L$", and the widthwise (transverse) direction thereof is called a "widthwise direction $D_W$". Also, the direction of a ridgeline $l_r$ of the triangular pillar 4c formed in the first optical layer 4 is called a "ridgeline direction $D_R$".

The triangular pillars 4c are preferably formed in the first optical layer 4 such that the ridgeline $l_r$ of each triangular pillar 4c is parallel to the widthwise direction $D_W$ of the optical film 1. The ridgeline direction $D_R$ of the triangular pillar 4c and the lengthwise direction $D_L$ of the optical film 1 are preferably in an orthogonal relation. On such a condition, the reflection function of the optical film 1 can be effectively developed just by affixing the optical film 1 having the belt-like shape or the rectangular shape to, e.g., the wall member of the building in such a state that the height direction of the building and the lengthwise direction $D_L$ of the optical film 1 having the belt-like shape or the rectangular shape are substantially parallel to each other.

Method of Affixing Optical Film

Figure 30A:
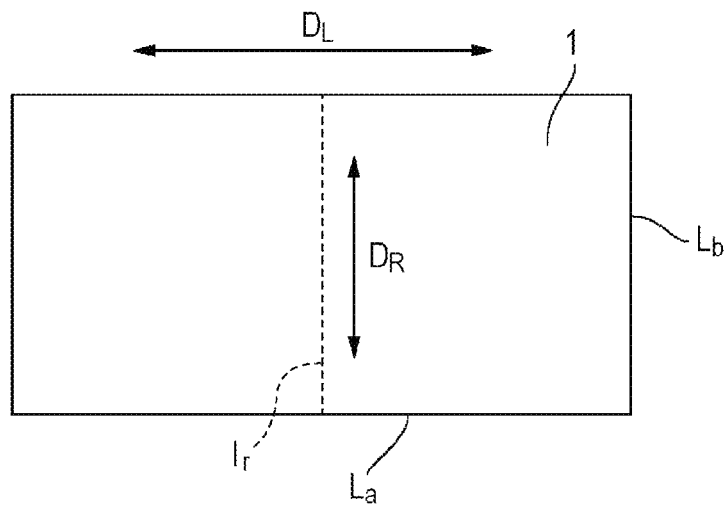
FIGS. 30A and 30B are illustrations to explain one example of manner of affixing the optical film according to the first embodiment.
Figure 30B:
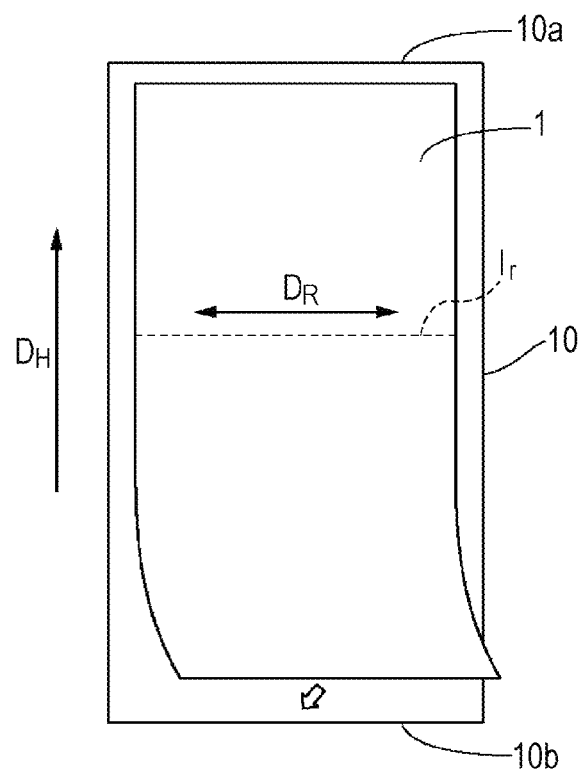

FIGS. 30A and 30B are illustrations to explain one example of a manner of affixing the optical film according to the first embodiment. The following description is made in connection with an example in which the optical film 1 is affixed to the wall member 10 having a rectangular shape with a vertical size being larger than a horizontal size.

First, the belt-shaped optical film 1 is let out from a roll of the wound optical film 1 (i.e., from the so-called stock roll) and is cut in an appropriate length corresponding to the shape of the wall member 10 to which the optical film 1 is to be affixed, thereby obtaining the optical film 1 having a rectangular shape. As illustrated in FIG. 30A, the rectangular optical film 1 has a pair of opposing long sides $L_a$ and a pair of opposing short sides $L_b$. The long sides $L_a$ of the rectangular optical film 1 are substantially orthogonal to the ridgeline direction $D_R$ of the triangular pillar 4c in the incident surface of the optical film 1. In other words, the lengthwise direction $D_L$ of the rectangular optical film 1 is substantially orthogonal to the ridgeline direction $D_R$ of the triangular pillar 4c in the incident surface of the optical film 1.

Next, one short side $L_b$ of the cut optical film 1 is aligned with one short side 10a of the rectangular wall member 10, the one short side 10a being positioned at an upper end of the wall member 10. Next, the rectangular optical film 1 is gradually affixed to the wall member 10 in a direction from the upper end toward the lower end thereof with the aid of, e.g., the affixing layer 6 interposed between them. The other short side $L_b$ of the optical film 1 is aligned with the other short side 10b of the rectangular wall member 10, the other short side 10b being positioned at the lower end of the wall member 10. Next, when necessary, the surface of the optical film 1 affixed to the wall member 10 is pressed, for example, to purge out bubbles trapped between the wall member 10 and the optical film 1. As a result, the rectangular optical film 1 is affixed to the wall member 10 in such a state that the ridgeline direction $D_R$ of the triangular pillar 4c in the incident surface of the optical film 1 is substantially orthogonal to the height direction $D_H$ of a building, e.g., a high-rise building.

Direction of Affixing of Optical Film

FIGS. 31A and 31B are illustrations to explain the difference in reflection function of the optical film 1 depending on the direction of affixing of the optical film.

FIG. 31A illustrates an example of a building 500 in which the optical film 1 is affixed to the wall member 10 such that the ridgeline direction $D_R$ of the triangular pillar 4c in the incident surface of the optical film 1 is substantially orthogonal to the height direction $D_H$ of the building. In other words, FIG. 31A illustrates the case where the optical film 1 is affixed to the wall member 10 in accordance with the above-described manner of affixing the optical film. When the optical film 1 is affixed to the wall member 10 as described above, the reflection function of the optical film 1 can be effectively developed. Accordingly, the light impinging against the wall member 10 from the upward can be reflected in a larger amount to the upward. Thus, the upward reflection of the wall member 10 can be increased.

FIG. 31B illustrates an example of a building 600 in which the optical film 1 is affixed to the wall member 10 such that the ridgeline direction $D_R$ of the triangular pillar 4c in the incident surface of the optical film 1 is obliquely oriented with respect to the height direction $D_H$ of the building 600 instead of being orthogonal thereto. When the optical film 1 is affixed to the wall member 10 as described above, the reflection function of the optical film 1 is not effectively developed. Accordingly, the proportion at which the light impinging against the wall member 10 from the upward is reflected to the downward is increased. Thus, the upward reflection of the wall member 10 is reduced.

Apparatus for Manufacturing Optical Film

Figure 7:
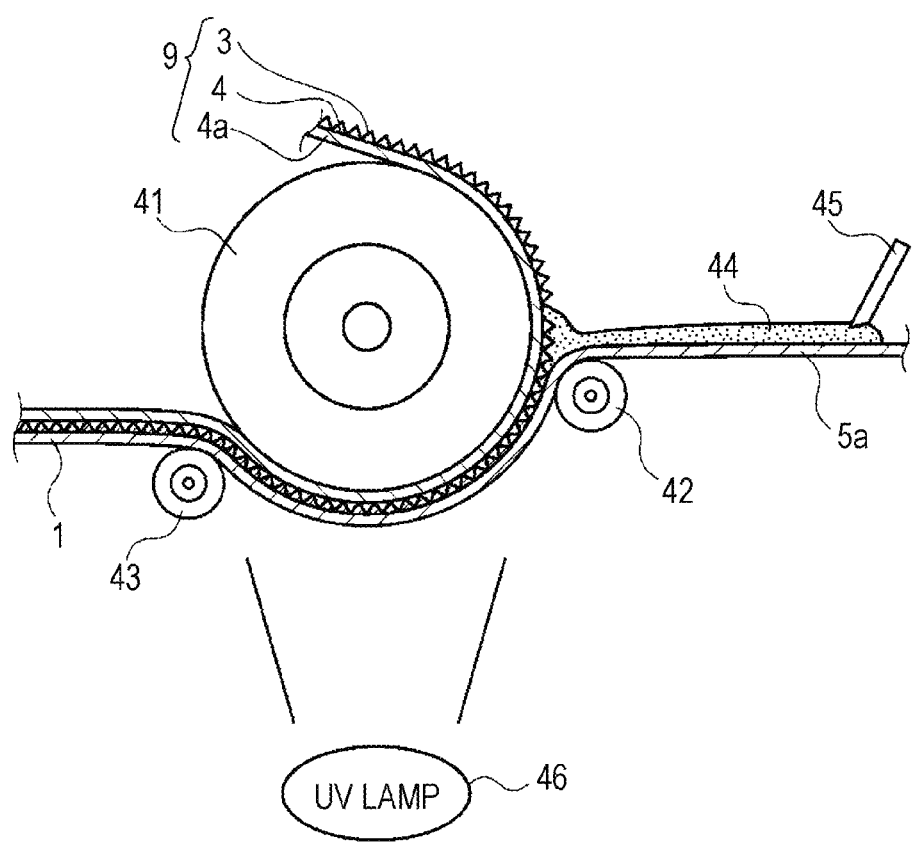
FIG. 7 is a schematic view illustrating one example of construction of an apparatus for manufacturing the optical film according to the first embodiment.

FIG. 7 is a schematic view illustrating one example of construction of an apparatus for manufacturing the optical film according to the first embodiment. As illustrated in FIG. 7, the manufacturing apparatus includes laminating rolls 41 and 42, a guide roll 43, a coating device 45, and an irradiation device 46.

The laminating rolls 41 and 42 are arranged to be able to nip a reflecting-layer affixed optical layer 9 and the second base 5a therebetween. The reflecting-layer affixed optical layer 9 is a layer obtained by forming the reflecting layer 3 on one principal surface of the first optical layer 4. The reflecting-layer affixed optical layer 9 may further include the first base 4a disposed on the other principal surface of the first optical layer 4 on the opposite side to the one principal surface thereof on which the reflecting layer 3 is formed. In the illustrated example, the reflecting layer 3 is formed on the one principal surface of the first optical layer 4, and the first base 4a is disposed on the other principal surface of the first optical layer 4. The guide roll 43 is arranged in a conveying path inside the manufacturing apparatus to be able to convey the optical film 1 having a belt-like shape. Materials of the laminating rolls 41 and 42 and the guide roll 43 are not limited to particular ones. A metal such as stainless steel, rubber, silicone, etc. can be optionally used, as appropriate, depending on the desired roll characteristics.

The coating device 45 can be prepared as a device including a coating unit, such as a coater. As the coater, ordinary coaters including a gravure coater, a wire bar, and a die can be optionally used, as appropriate, in consideration of physical properties of the resin composition to be coated, etc. The irradiation device 46 is a device for irradiating the resin composition with an ionizing ray, e.g., an electron ray, an ultraviolet ray, a visible ray, or a gamma ray. In the illustrated example, a UV lamp emitting an ultraviolet ray is used as the irradiation device 46.

Method of Manufacturing Optical Film

One example of a method of manufacturing the optical film according to the first embodiment will be described below with reference to FIGS. 7 to 10. Note that, in consideration of productivity, part or the whole of a manufacturing process described below is preferably performed in the roll-to-roll manner except for a step of fabricating a mold (or a die).

Figure 8A:
FIGS. 8A to 8C illustrate successive steps to explain one example of a method of manufacturing the optical film according to the first embodiment.
Figure 8B:
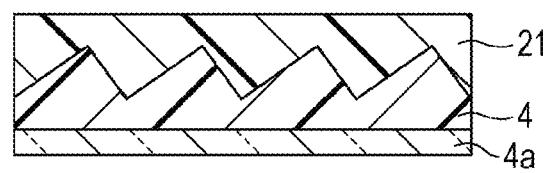

First, as illustrated in FIG. 8A, a mold (or a die) 21 having the same concave-convex shape as that of the triangular pillars 4c, or a mold (or a die) (replica) having a shape reversed to the concave-convex shape of the former mold (die) is formed by, e.g., bite machining or laser machining. Next, as illustrated in FIG. 8B, the concave-convex shape of the mold (die) 21 is transferred to a resin material in the form of a film by utilizing, e.g., a fusion extrusion process or a transfer process. The transfer process can be practiced, for example, by a method of pouring an energy-ray curable resin into a mold and irradiating the poured resin with an energy ray to cure the resin, or a method of applying heat and/or pressure to a resin for transferring the desired shape to the resin, or a method (laminating transfer process) of supplying a resin film from a stock roll and transferring the shape of a die to the resin film under application of heat. Through the above-described steps, as illustrated in FIG. 8C, the first optical layer 4 having the triangular pillars 4c on one principal surface thereof is formed.

Figure 8C:
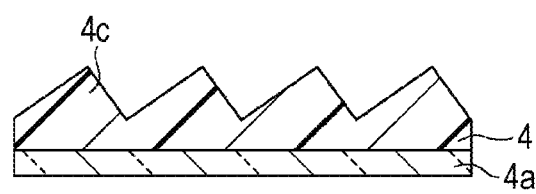

Further, as illustrated in FIG. 8C, the first optical layer 4 may be formed on the first base 4a. This case can be practiced, for example, by a process of supplying the first base 4a in the form of film from a stock roll, coating an energy-ray curable resin on the first base 4a, pressing the resin against a die to transfer the shape of the die to the resin, and irradiating the resin with an energy ray to cure it. Preferably, the resin further contains a cross-linking agent. The reason is that the cross-linking agent makes the resin heat-resistant without changing the storage modulus at the room temperature to a large extent.

Figure 9A:
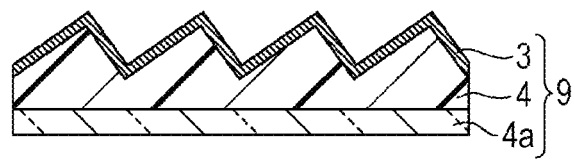
FIGS. 9A to 9C illustrate successive steps to explain one example of the method of manufacturing the optical film according to the first embodiment.
Figure 9B:
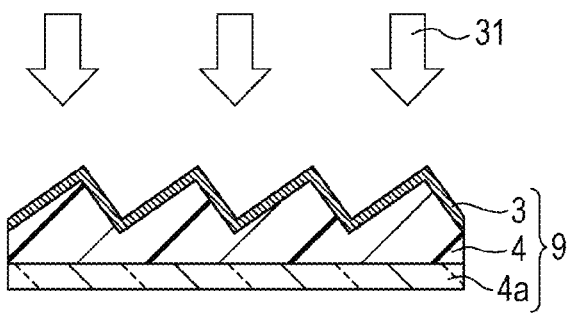

Next, as illustrated in FIG. 9A, the reflecting layer 3 is formed on the one principal surface of the first optical layer 4. The reflecting layer 3 can be formed, for example, by sputtering, evaporation, CVD (Chemical Vapor Deposition), dip coating, die coating, wet coating, or spray coating. Preferably, a practical method of forming the reflecting layer 3 is optionally selected from those film forming methods depending on the shape of the triangular pillar 4c, etc. Next, as illustrated in FIG. 9B, the reflecting layer 3 is subjected to annealing as indicated by 31, when necessary. The temperature of the annealing is in the range of, e.g., 100° C. or higher to 250° C. or lower.

Figure 9C:
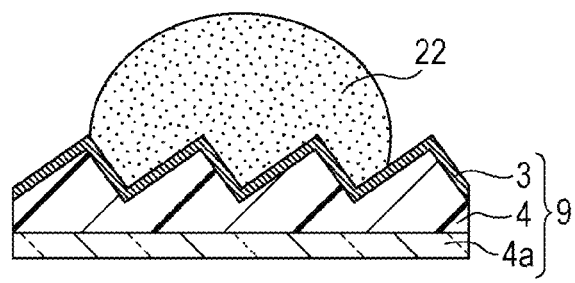
Figure 10A:
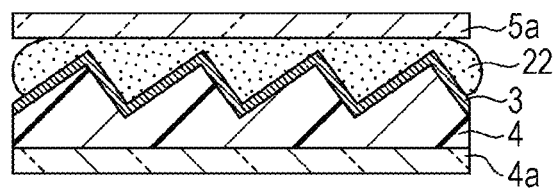
FIGS. 10A to 10C illustrate successive steps to explain one example of the method of manufacturing the optical film according to the first embodiment.
Figure 10B:
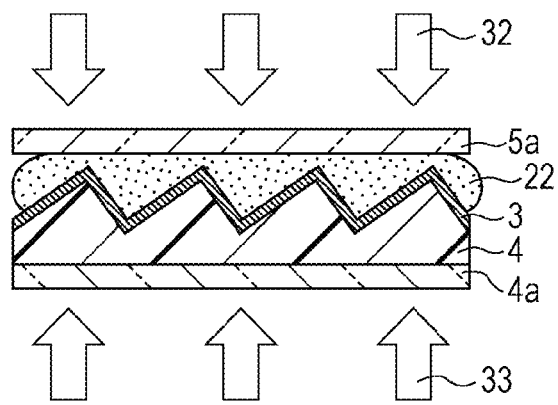
Figure 10C:
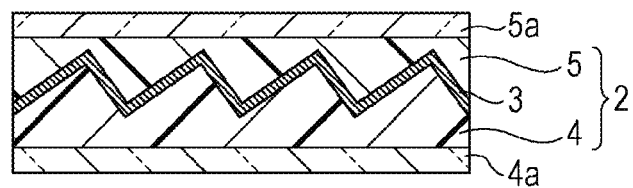

Next, as illustrated in FIG. 9C, a resin 22 in a not-yet-cured state is coated over the reflecting layer 3. The resin 22 may be, e.g., an energy-ray curable resin or a thermosetting resin. The energy-ray curable resin used here is preferably an ultraviolet-ray curable resin. Next, as illustrated in FIG. 10A, a laminate is formed by placing the second base 5a over the resin 22. Next, as illustrated in FIG. 10B, the resin 22 is cured by applying, e.g., an energy ray or heat as indicated by 32, while pressure is applied to the laminate as indicated by 33. Examples of the energy ray usable here include an electron ray, an ultraviolet ray, a visible ray, and a gamma ray. The ultraviolet ray is more preferable from the viewpoint of production equipment. Preferably, an integrated irradiation amount is selected, as appropriate, in consideration of the curing characteristic of the resin, suppression of yellowing of the resin and the second base 5a, etc. The pressure applied to the laminate is preferably in the range of 0.01 MPa or higher to 1 MPa or lower. If the applied pressure is lower than 0.01 MPa, a problem may occur in traveling of the film. On the other hand, if the applied pressure exceeds 1 MPa, a metal roll is to be used as the nip roll, and the applied pressure is more apt to fluctuate. Through the above-described steps, as illustrated in FIG. 10C, the second optical layer 5 is formed on the reflecting layer 3 and the optical film 1 is obtained.

A method of forming the optical film 1 by using the manufacturing apparatus, illustrated in FIG. 7, will be described in more detail below. First, the second base 5a is let out from a base supply roll (not shown), and the let-out second base 5a is guided to pass under the coating device 45. Next, an ionizing-ray curable resin 44 is coated by the coating device 45 over the second base 5a passing under the coating device 45. Next, the second base 5a coated with the ionizing-ray curable resin 44 is conveyed toward the laminating rolls 41 and 42. On the other hand, the reflecting-layer affixed optical layer 9 is let out from an optical layer supply roll (not shown) and is conveyed toward the laminating rolls 41 and 42.

Next, the second base 5a and the reflecting-layer affixed optical layer 9, each having been conveyed as described above, are sandwiched between the laminating rolls 41 and 42 without allowing bubbles to enter between the second base 5a and the reflecting-layer affixed optical layer 9, whereby the reflecting-layer affixed optical layer 9 is laminated on the second base 5a. Next, the second base 5a including the laminated reflecting-layer affixed optical layer 9 is conveyed along an outer circumferential surface of the laminating roll 41 while the irradiation device 46 irradiates the ionizing-ray curable resin 44 with the ionizing ray from the side including the second base 5a, thereby curing the ionizing-ray curable resin 44. As a result, the second base 5a and the reflecting-layer affixed optical layer 9 are affixed to each other with the ionizing-ray curable resin 44 interposed therebetween, and the objective optical film 1 having a long size is fabricated. Next, the fabricated belt-shaped optical film 1 is taken up by a take-up roll (not shown). Eventually, a stock roll in the rolled form of the belt-shaped optical film 1 is obtained.

Given that the process temperature in the above-described process of forming the second optical layer 5 is t° C., the first optical layer 4 in the cured state preferably has the storage modulus of $3 \times 10^7$ Pa or more at (t-20° C. Herein, the process temperature t is, for example, the heating temperature of the laminating roll 41. The first optical layer 4 is conveyed, for example, in such a state that the first optical layer 4 is formed on the first base 4a and is conveyed along the laminating roll 41 with the first base 4a interposed therebetween. It is, therefore, empirically confirmed that the actual temperature of the first optical layer 4 is about (t-20° C. Accordingly, by setting the storage modulus of the first optical layer 4 to be $3 \times 10^7$ Pa or more at (t-20° C., the concave-convex shape of the interface inside the optical layer can be prevented from deforming due to application of heat or both of heat and pressure.

Further, the first optical layer 4 preferably has the storage modulus of $3 \times 10^9$ Pa or less at 25° C. With such a property, the optical film 1 can be given with flexibility at the room temperature. Hence, the optical film 1 can be fabricated, for example, by using the roll-to-roll manufacturing process.

In consideration of the heat resistance of the resin used as the optical layer or the base, the process temperature t is preferably 200° C. or lower. However, when a resin having higher heat resistance is used, the process temperature t can be set to 200° C. or higher.

According to the first embodiment, in the optical film 1 capable of directionally reflecting the incident light, the number of times of reflections by the reflecting layer 3 can be reduced to one or two. As a result, heat generation due to absorption of light by the reflecting layer 3 can be reduced and energy-saving (e.g., reduction in the amount of CO2 emission) can be realized.

Further, since the plural asymmetrical triangular pillars 4c are arrayed in the one-dimensional pattern and the apex angle a and the slope angle β of the triangular pillars 4c are set to satisfy the above-mentioned formula (1) or (2), a high upward reflectance can be obtained. In addition, the film thickness of the reflecting layer can be reduced in comparison with that in the case where corner cubes are two-dimensionally arrayed. As a result, the optical film 1 can be fabricated at a lower cost.

Modifications

Modifications of the first embodiment will be described below.

First Modification

Figure 11A:
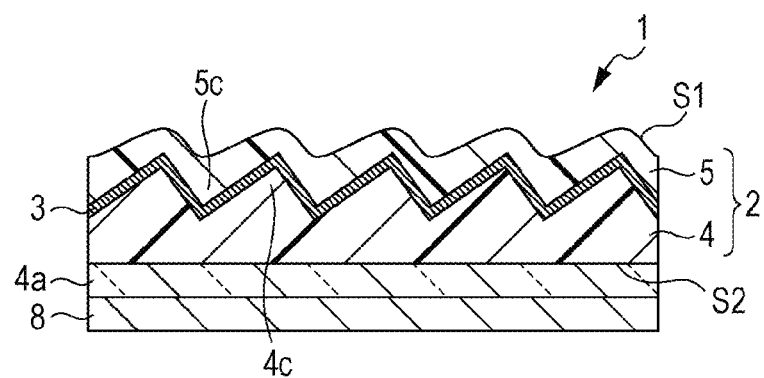
FIG. 11A is a sectional view illustrating a first modification of the first embodiment.

FIG. 11A is a sectional view illustrating a first modification of the first embodiment. As illustrated in FIG. 11A, an optical film 1 according to the first modification has an incident surface S1 in a concave-convex shape. The concave-convex shape of the incident surface S1 is formed to follow the concave-convex shape of the first optical layer 4, for example, such that positions of apex portions of convexes and positions of bottom portions of concaves are aligned between both the concave-convex shapes. The concave-convex shape of the incident surface S1 is preferably gentler than that of the first optical layer 4.

Second Modification

Figure 11B:
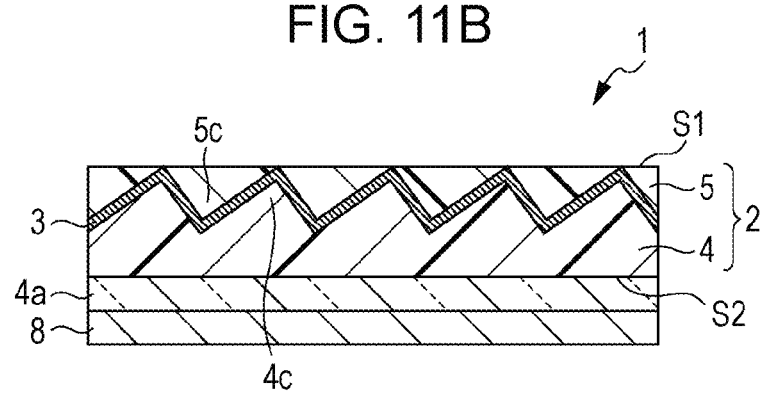
FIG. 11B is a sectional view illustrating a second modification of the first embodiment.

FIG. 11B is a sectional view illustrating a second modification of the first embodiment. As illustrated in FIG. 11B, an optical film 1 according to the second modification is formed such that apex portions of convexes in the concave-convex shape of the first optical layer 4, on which the reflecting layer 3 is formed, are substantially flush with the incident surface S1 of the second optical layer 5.

2. Second Embodiment

Figure 12:
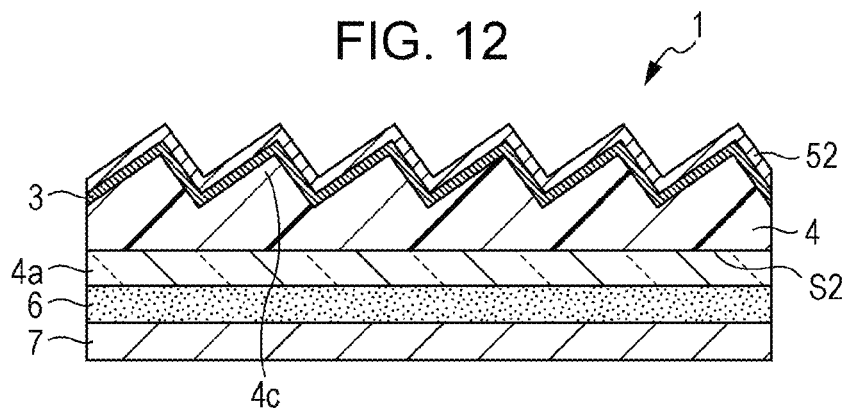
FIG. 12 is a sectional view illustrating one example of construction of an optical film according to a second embodiment.

FIG. 12 is a sectional view illustrating one example of construction of an optical film 1 according to a second embodiment. The second embodiment differs from the first embodiment in that a surface of the reflecting layer 3 on the side providing the incident surface is exposed without being embedded with the second optical layer 5.

From the viewpoint of increasing durability of the reflecting layer 3, a protective layer 52 is preferably formed on the surface of the reflecting layer 3, which serves as the incident surface. Preferably, the protective layer 52 is formed on the reflecting layer 3 to follow the concave-convex surface of the first optical layer 4. From the viewpoint of directionally reflecting the incident light by the reflecting layer 3, the protective layer 52 preferably has transparency. The protective layer 52 can be made of, e.g., dielectric materials, such as SiN, ZnS—$SiO_2$, AN, $Al_2O_3$, $SiO_2$—$Cr_2O_3$—$ZrO_2$, $SiO_2$—$In_2O_3$—$ZrO_2$, $TiO_2$, $Nb_2O_5$, and $Ta_2O_5$.

The second embodiment can also provide similar advantages to those obtained with the first embodiment.

3. Third Embodiment

Figure 13:
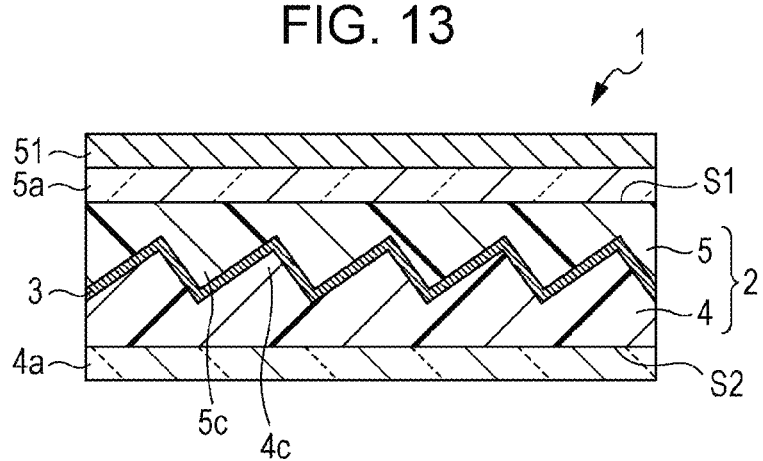
FIG. 13 is a sectional view illustrating one example of construction of an optical film according to a third embodiment.

FIG. 13 is a sectional view illustrating one example of construction of an optical film 1 according to a third embodiment. The third embodiment differs from the first embodiment in that the former further includes a self-cleaning effect layer 51, which develops a cleaning effect in itself, on an exposed surface of the optical film 1 on the opposite side to one of the incident surface S1 and the rear surface S2 thereof, which one is affixed to the adherend. The self-cleaning effect layer 51 includes, for example, a photocatalyst. For example, $TiO_2$ can be used as the photocatalyst.

As described above, the optical film 1 is featured in directionally reflecting the incident light. When the optical film 1 is used outdoors or in a dirty room, for example, light is scattered due to dirt and dust adhering to the surface of the optical film 1, whereby transmissivity and reflectivity are lost. Therefore, the surface of the optical film 1 is preferably optically transparent at all times. In other words, it is preferable that the surface of the optical film 1 is superior in the water-repellent or hydrophilic property, for example, and it can automatically develop the self-cleaning effect.

According to the third embodiment, since the optical film 1 includes the self-cleaning effect layer 51, the water-repellent or hydrophilic property, for example, can be given to the incident surface. Hence, it is possible to suppress dirt and dust from adhering to the incident surface and to suppress degradation of the directional reflection characteristic.

4. Fourth Embodiment

While the first embodiment has been described above, by way of example, in connection with case of applying the present technology to, e.g., the wall member, embodiments of the present technology are not limited to the above-described application and can be further applied to various interior and exterior members, etc. other than the wall member. Stated another way, the optical film according to the embodiment is applicable to not only fixedly installed interior and exterior members, such as walls and roofs, but also to a device capable of adjusting an amount of the transmitted and/or reflected sunlight by moving an interior or external member depending on changes in amount of the sunlight, which are caused with the shift of seasons and the elapse of time, etc., and taking the adjusted amount of the sunlight into an indoor space, etc. In a fourth embodiment, one example of such a device is described in connection with a solar shading device (in the form of a window blind or a shade) capable of adjusting a degree at which a group made up of plural solar shading members cuts off the incident light, by changing an angle of the solar shading member group.

Figure 14:
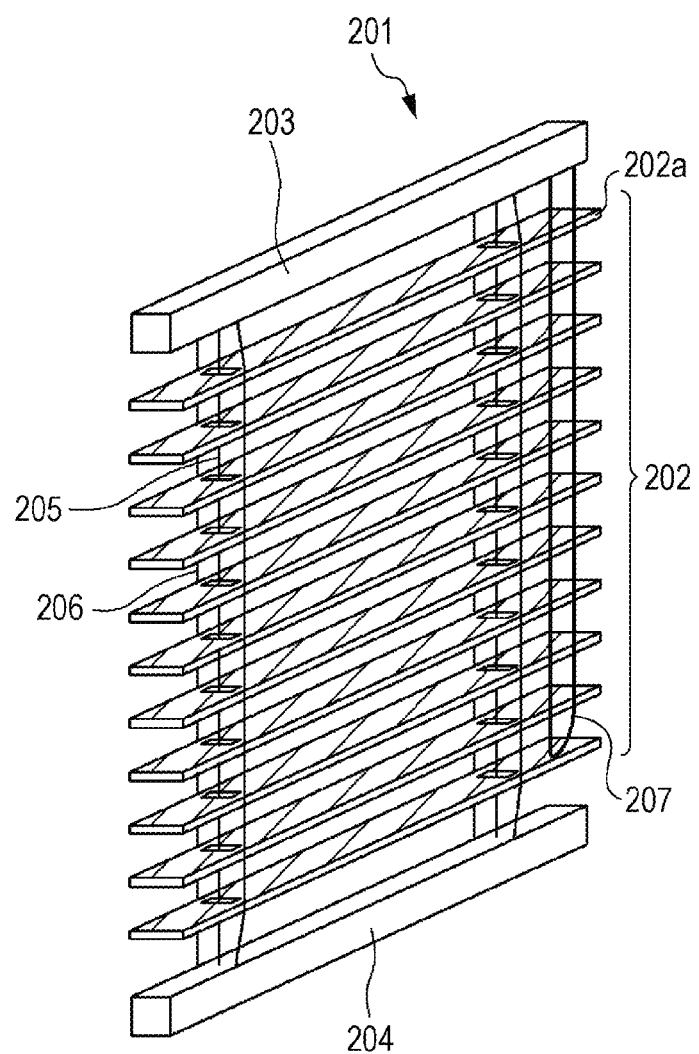
FIG. 14 is a perspective view illustrating one example of construction of a window blind (shade) according to a fourth embodiment.

FIG. 14 is a perspective view illustrating one example of construction of a window blind (shade) 201 according to the fourth embodiment. As illustrated in FIG. 14, the window blind 201 as one example of the solar shading device includes a head box 203, a slat group (solar shading member group) 202 made up of plural slats (blades) 202a, and a bottom rail 204. The head box 203 is disposed above the slat group 202 made up of the plural slats 202a. Ladder chords 206 and rise-and-fall chords 205 are extended downward from the head box 203, and the bottom rail 204 is suspended at lower ends of those chords. The slats 202a serving as the solar shading members are each formed in a slender rectangular shape, for example, and are supported by the ladder chords 206, which are extended downward from the head box 203, at predetermined intervals in a suspended state. Further, the head box 203 is provided with an operating member (not shown), such as a rod, for adjusting an angle of the slat group 202 made up of the plural slats 202a.

The head box 203 serves as a driving unit for rotating the slat group 202 made up of the plural slats 202a in accordance with operation of the operating member, such as the rod, thereby adjusting the amount of light taken into an indoor space, for example. Further, the head box 203 has the function of a driving unit (raising and lowering unit) for raising and lowering the slat group 202, as appropriate, in accordance with operation of an operating member, e.g., a rise-and-fall operating chord 207.

Figure 15A:
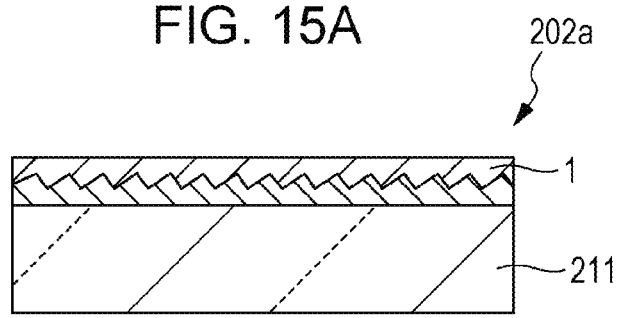
FIG. 15A is a sectional view illustrating a first example of construction of a slat.

FIG. 15A is a sectional view illustrating a first example of construction of the slat 202a. As illustrated in FIG. 15A, the slat 202a includes a base 211 and an optical film 1. The optical film 1 is preferably disposed on one of two principal surfaces of the base 211, the one principal surface being positioned on the side including an incident surface on which extraneous light is incident when the slat group 202 is in a closed state (e.g., on the side facing a window member). The optical film 1 and the base 211 are affixed to each other with an affixing layer, e.g., a bonding layer or an adhesive layer, interposed between them.

The base 211 can be formed in the shape of, e.g., a sheet, a film, or a plate. The base 211 can be made of, e.g., glass, resin, paper, or cloth. In consideration of the case of taking visible light into a predetermined indoor space, for example, a resin having transparency is preferably used as the material of the base 211. The glass, the resin, the paper, or the cloth used here may be the same as that generally used in ordinary rolling screens. The optical film 1 used here may be one type or a combination of two or more types of the optical films 1 according to the above-described first to third embodiments.

Figure 15B:
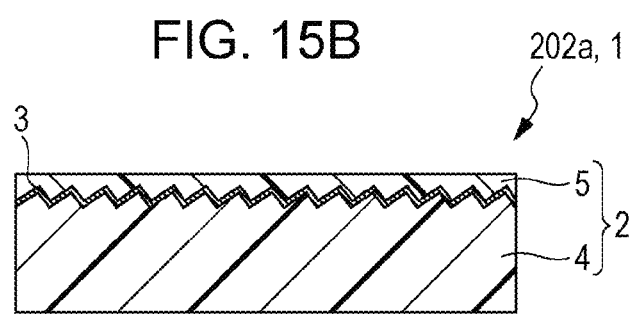
FIG. 15B is a sectional view illustrating a second example of construction of the slat.

FIG. 15B is a sectional view illustrating a second example of construction of the slat 202a. In the second example, as illustrated in FIG. 15B, the optical film 1 is used itself as the slat 202a. In this case, the optical film 1 preferably has such a level of rigidity that the optical film 1 can be supported by the ladder chords 206 and can maintain its shape in a supported state.

5. Fifth Embodiment

A fifth embodiment will be described below in connection with a rolling screen device, i.e., another example of the solar shading device capable of adjusting a degree at which a solar shading member cuts off the incident light, by winding or unwinding the solar shading member.

Figure 16A:
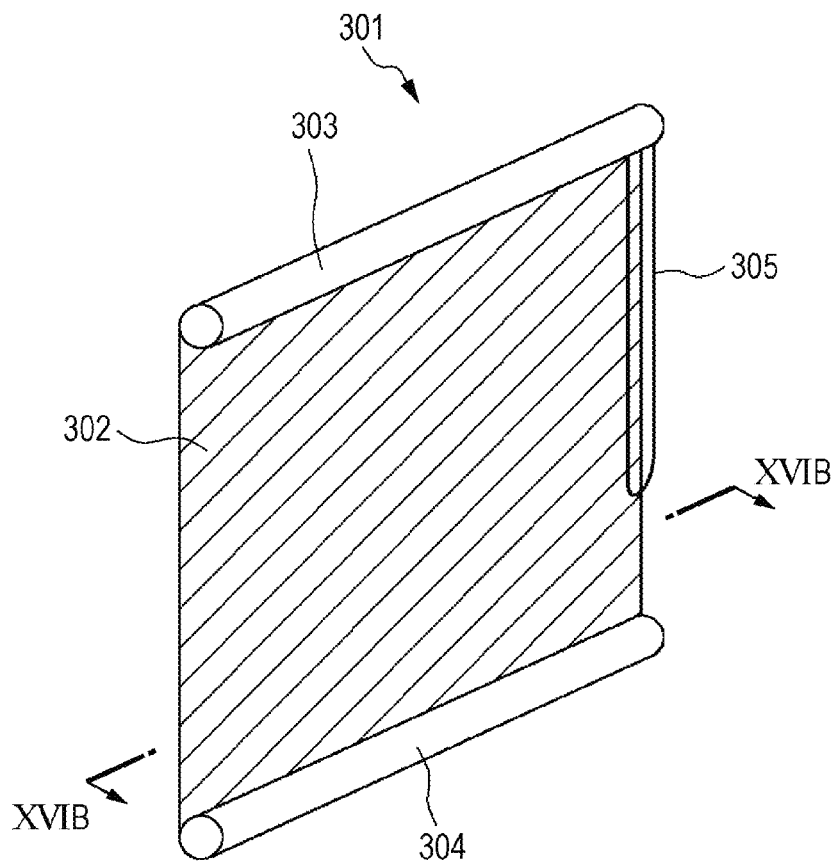
FIG. 16A is a perspective view illustrating one example of construction of a rolling screen device according to a fifth embodiment.

FIG. 16A is a perspective view illustrating one example of construction of a rolling screen device 301 according to the fifth embodiment. As illustrated in FIG. 16A, the rolling screen device 301 as another example of the solar shading device includes a screen 302, a head box 303, and a core member 304. The head box 303 can raise and fall the screen 302 with operation of an operating member, such as a chain 305. The head box 303 includes therein a winding shaft for taking up and letting out the screen 302, and one end of the screen 302 is coupled to the winding shaft. Further, the core member 304 is coupled to the other end of the screen 302. Preferably, the screen 302 has flexibility. The shape of the screen 302 is not limited to particular one and is preferably selected depending on the shape of, e.g., a window member to which the rolling screen device 301 is applied. For example, the screen 302 has a rectangular shape.

Figure 16B:
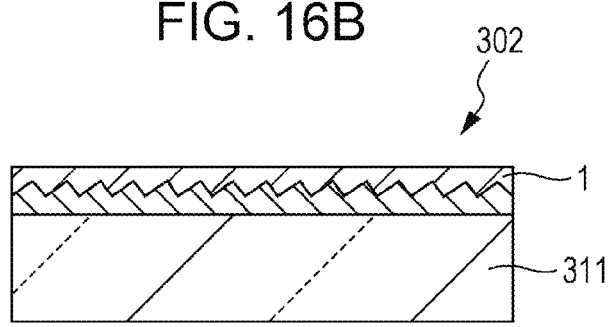
FIG. 16B is a sectional view, taken along line XVIB-XVIB in FIG. 16A, illustrating one example of construction of a screen.

FIG. 16B is a sectional view, taken along line XVIB-XVIB in FIG. 16A, illustrating one example of construction of the screen 302. As illustrated in FIG. 16B, the screen 302 includes a base 311 and an optical film 1. The screen 302 preferably has flexibility. The optical film 1 is preferably disposed on one of two principal surfaces of the base 311, the one principal surface being positioned on the side including an incident surface on which extraneous light is incident (e.g., on the side facing the window member). The optical film 1 and the base 311 are affixed to each other with an affixing layer, a bonding layer or an adhesive layer, interposed between them. Note that the construction of the screen 302 is not limited to the illustrated example and the optical film 1 may be used itself as the screen 302.

The base 311 can be formed in the shape of, e.g., a sheet, a film, or a plate. The base 311 can be made of, e.g., glass, resin, paper, or cloth. In consideration of the case of taking visible light into a predetermined indoor space, for example, a resin having transparency is preferably used as the material of the base 311. The glass, the resin, the paper, or the cloth used here may be the same as that generally used in ordinary rolling screens. The optical film 1 used here may be one type or a combination of two or more types of the optical films 1 according to the above-described first to third embodiments.

6. Sixth Embodiment

A sixth embodiment will be described in connection with the case of applying the present technology to a fitting (e.g., an interior or exterior member) that includes a shading portion provided with an optical body having the directional reflective property.

Figure 17A:
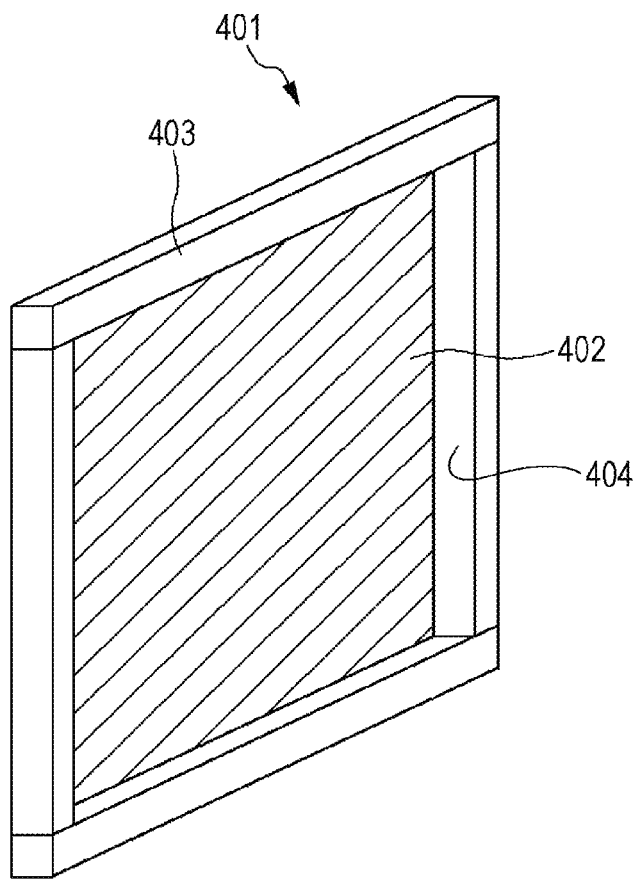
FIG. 17A is a perspective view illustrating one example of construction of a fitting according to a sixth embodiment.

FIG. 17A is a perspective view illustrating one example of construction of a fitting 401 according to the sixth embodiment. As illustrated in FIG. 17A, the fitting 401 includes a shading portion 404 provided with an optical body 402. More specifically, the fitting 401 includes the optical body 402 and a frame member 403 that is disposed in a peripheral portion of the optical body 402. The optical body 402 is fixedly held by the frame member 403, but the optical body 402 can be removed, when necessary, by disassembling the frame member 403. While one example of the fitting 401 is a shoji (i.e., a paper-made and/or glass-fitted sliding door), applications of the present technology are not limited to such an example and embodiments of the present technology can be applied to various types of fittings that include shading portions.

Figure 17B:
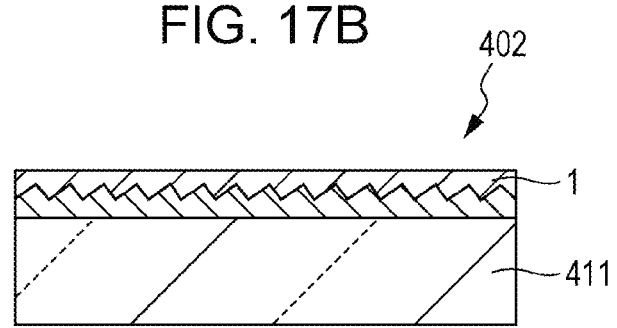
FIG. 17B is a sectional view illustrating one example of construction of an optical body used in the fitting.

FIG. 17B is a sectional view illustrating one example of construction of the optical body 402. As illustrated in FIG. 17B, the optical body 402 includes a base 411 and an optical film 1. The optical film 1 is disposed on one of two principal surfaces of the base 411, the one principal surface being positioned on the side including an incident surface on which extraneous light is incident (e.g., on the side facing the window member or outward). The optical film 1 and the base 411 are affixed to each other with an affixing layer, e.g., a bonding layer or an adhesive layer, interposed between them. Note that the construction of the shoji (specifically the optical body 402) is not limited to the illustrated example and the optical film 1 may be used itself as the optical body 402.

The base 411 is formed of, e.g., a sheet, a film, or a plate each having flexibility. The base 411 can be made of, e.g., glass, resin, paper, or cloth. In consideration of the case of taking visible light into a predetermined indoor space, for example, a resin having transparency is preferably used as the material of the base 411. The glass, the resin, the paper, or the cloth used here may be the same as that generally used as optical bodies in ordinary fittings. The optical film 1 used here may be one type or a combination of two or more types of the optical films 1 according to the above-described first to third embodiments.

EXAMPLES

The present technology will be described in more detail below in connection with TEST EXAMPLES and EXAMPLES, but the present technology is not limited to the following TEST EXAMPLES and EXAMPLES.

Figure 18:
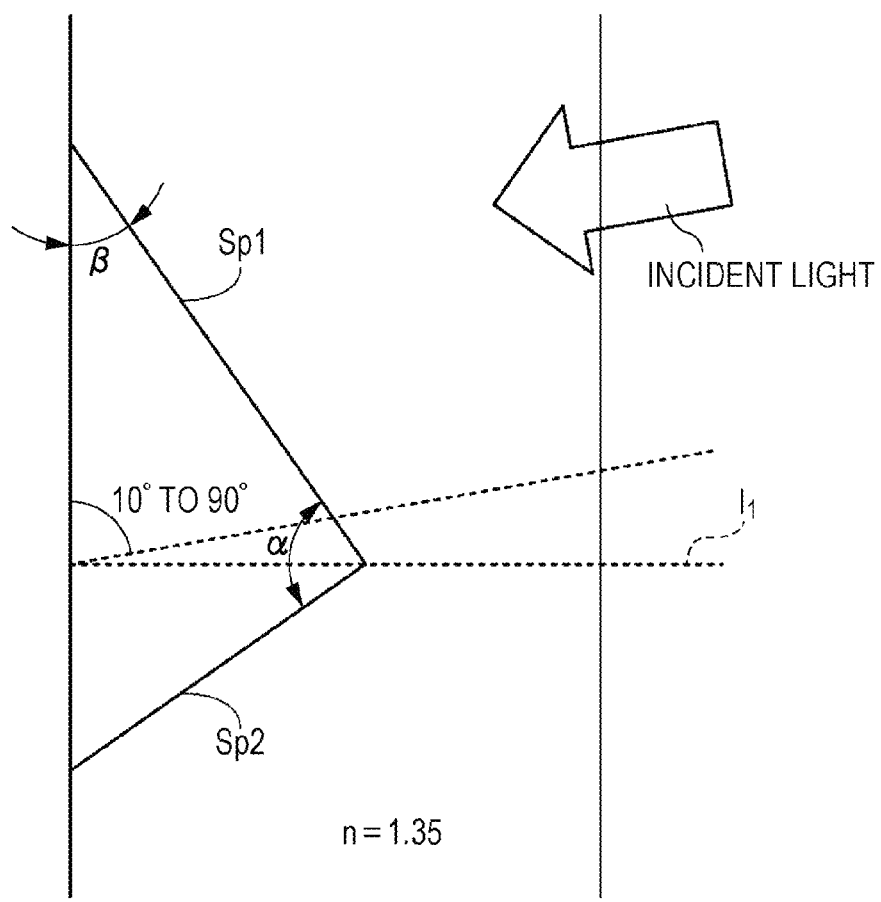
FIG. 18 is an illustration to explain the definition of upward reflectance.

FIG. 18 is an illustration to explain the definition of upward reflectance.

In the following TEST EXAMPLES and EXAMPLES, the upward reflectance is defined as follows;

upward reflectance Ru=[(total power of light reflected in upward direction)/(total power of incident light)]×100 where power of incident light=(power of light reflected in upward direction)+(power of light reflected in downward direction), upward direction: reflection angle (θ, φ)=(90°, φ) to (10°, φ), downward direction: reflection angle (θ, φ)=(10°, φ) to (−90°, φ), and direction of θ=10° is included in the upward direction.

In the following TEST EXAMPLES and EXAMPLES, assuming a state that the optical film is affixed to the adherend, e.g., the wall member, as illustrated in FIG. 18, a first surface Sp1 of two surfaces forming the triangular pillar, which is positioned on the upper side, is called an upper surface Sp1, and a second surface Sp2, which is positioned on the lower side, is called a lower surface Sp2.

Further, a film thickness of a totally reflecting layer or a wavelength-selective reflecting layer formed on the upper surface Sp1 (i.e., the first film thickness d1 in FIG. 4B) is called a film thickness d1 on an upper sloped surface, and a film thickness of a totally reflecting layer or a wavelength-selective reflecting layer formed on the lower surface Sp2 (i.e., the second film thickness d2 in FIG. 4B) is called a film thickness d2 on a lower sloped surface.

In the following TEST EXAMPLES and EXAMPLES, prism patterns 1 to 3 are defined as follows.

Prism Pattern 1

Figure 19A:
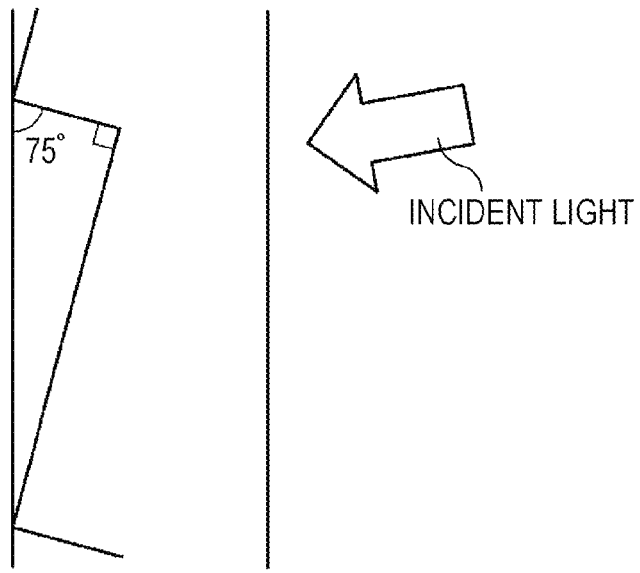
FIGS. 19A to 19C are illustrations to explain setting conditions for a simulation.

FIG. 19A is a sectional view illustrating the shape of the prism pattern 1. The prism pattern 1 is a pattern that is formed by packing asymmetrical triangular pillars in the closest-packed state under setting conditions given below:

Pitch: 100 μm
Apex angle α: 90°
Slope angle β: 75°
Symmetry: asymmetric

Prism Pattern 2

Figure 19B:
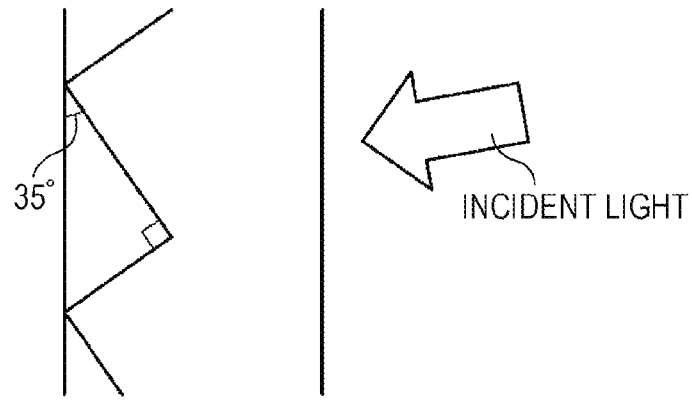

FIG. 19B is a sectional view illustrating the shape of the prism pattern 2. The prism pattern 2 is a pattern that is formed by packing asymmetrical triangular pillars in the closest-packed state under setting conditions given below:

Pitch: 100 μm
Apex angle α: 90°
Slope angle β: 35°
Symmetry: asymmetric

Prism Pattern 3

Figure 19C:
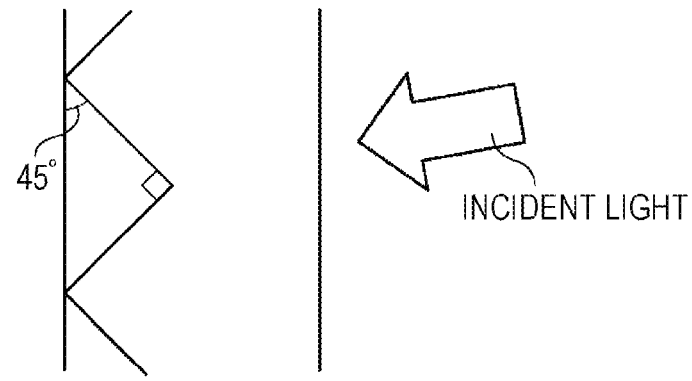

FIG. 19C is a sectional view illustrating the shape of the prism pattern 3. The prism pattern 3 is a pattern that is formed by packing asymmetrical triangular pillars in the closest-packed state under setting conditions given below:

Pitch: 100 μm
Apex angle α: 90°
Slope angle β: 45°
Symmetry: symmetric

In the following TEST EXAMPLES and EXAMPLES, the wavelength-selective reflecting layer and the totally reflecting layer are defined as follows.

Wavelength-Selective Reflecting Layer

The wavelength-selective reflecting layer is a reflecting layer that reflects only infrared light in a wavelength band of 780 to 2100 nm, and that transmits light other than such a wavelength band therethrough.

Totally Reflecting Layer

The totally reflecting layer is a reflecting layer that reflects all (100%) of the incident light regardless of the wavelength band.

TEST EXAMPLES and EXAMPLES will be described below in the following order.

1. Relationship of apex angle α and slope angle β versus upward reflectance
2. Relationship of incident angle and reflection angle versus upward reflectance
2-1. Calculation through simulation
2-2. Measurement with actual samples
3. Relationship of slope angle versus film thickness of wavelength-selective reflecting layer
4. Relationship of wavelength versus upward reflectance
5. Relationship of incident angle versus upward reflectance
6. Relationship of wavelength and incident angle versus upward reflectance
1. Relationship of apex angle α and slope angle β versus upward reflectance Test Example 1

An upward reflectance was determined through a simulation performed as described below by using the illumination design analysis software "Light Tools" available from ORA (Optical Research Associates).

First, a directional reflecting surface made up of asymmetrical triangular pillars in the closest-packed state was set. Setting conditions for the directional reflecting layer surface were as follows:

Pitch: 100 μm
Apex angle α: 20 to 160°
Slope angle β: 10 to 80°
Type of reflecting layer: totally reflecting layer Film thickness: film thickness d1 on the upper sloped surface and film thickness d2 on the lower sloped surface are constant Next, an imaginary sunlight source (color temperature of 6500K and wavelengths of 380 to 1200 nm) was set as a light source P, and an upward reflectance was determined by causing light to be incident on the directional reflecting surface from the direction of the incident angle (θ0, φ)=(60°, 0°). The measurement result is plotted in FIG. 20.

Figure 20:
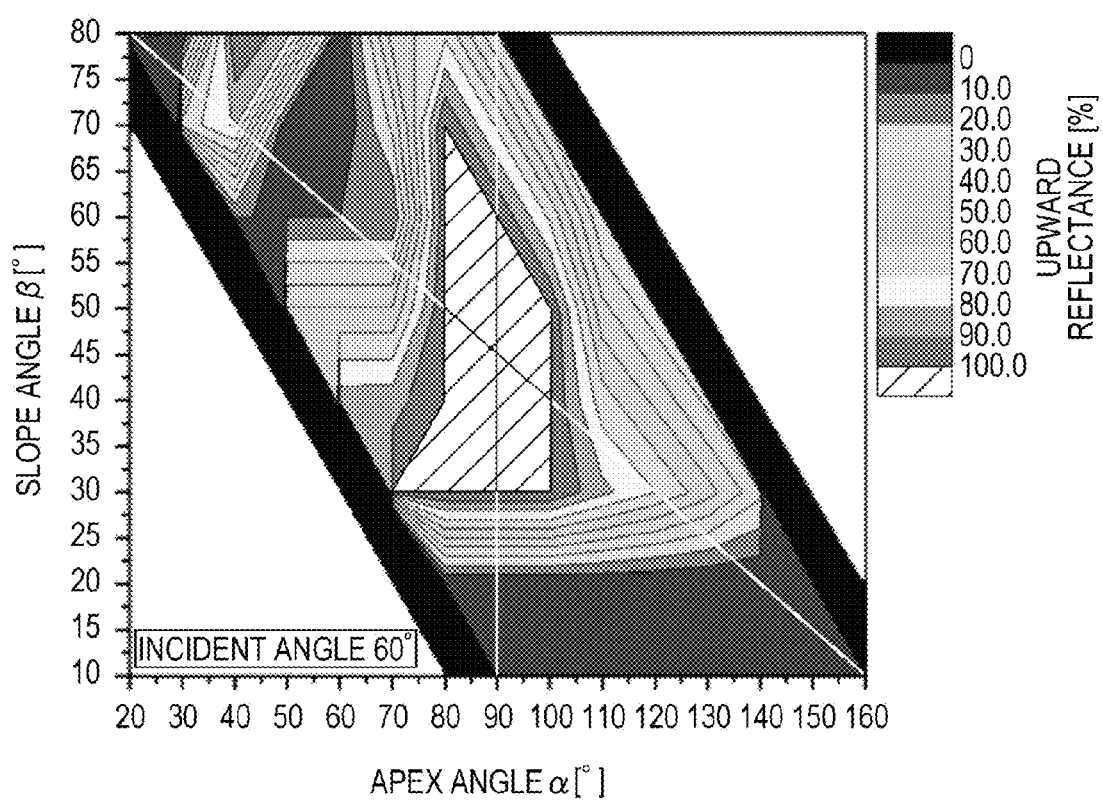
FIG. 20 is a plot illustrating the calculation result of upward reflectance through a simulation in TEST EXAMPLE 1.

The following points are understood from FIG. 20.

When the apex angle α and the slope angle β satisfy the following formula (1) or (2), the upward reflectance of 80% or more can be ensured:

$$30 \leq \beta \leq 4.5\alpha - 285 (70 \leq \alpha \leq 80) \quad (1)$$

$$30 \leq \beta \leq -1.5\alpha + 195 (80 \leq \alpha \leq 100) \quad (2)$$

Further, when the apex angle α and the slope angle β satisfy the following formula (3) or (4), the upward reflectance of 100% can be ensured:

$$30 \leq \beta \leq \alpha - 40 (70 \leq \alpha \leq 80) \quad (3)$$

$$30 \leq \beta \leq -\alpha + 150 (80 \leq \alpha \leq 100) \quad (4)$$

2. Relationship of incident angle and reflection angle versus upward reflectance
2-1. Calculation through simulation Test Example 2

An upward reflectance was determined through a simulation performed as described below by using the illumination design analysis software "Light Tools" available from ORA.

First, a directional reflecting surface having the following setting conditions was set:
Type of prism pattern: prism pattern 1
Type of reflecting layer: totally reflecting layer
Film thickness: film thickness d1 on the upper sloped surface and film thickness d2 on the lower sloped surface are constant Next, an imaginary sunlight source (color temperature of 6500K and wavelengths of 380 to 1200 nm) was set as a light source P, and an upward reflectance was determined while changing the incident angle (θ0, φ) in the range of (0°, 0°) to (90°,0°). The measurement result is plotted in FIG. 21A.

Test Example 3

An upward reflectance was determined in a similar manner to that in TEST EXAMPLE 2 except for modifying the setting conditions of the directional reflecting surface as follows. The measurement result is plotted in FIG. 21B.
Type of prism pattern: prism pattern 2
Type of reflecting layer: totally reflecting layer
Film thickness: film thickness d1 on the upper sloped surface and film thickness d2 on the lower sloped surface are constant Test Example 4

An upward reflectance was determined in a similar manner to that in TEST EXAMPLE 2 except for modifying the setting conditions of the directional reflecting surface as follows. The measurement result is plotted in FIG. 21C.

Figure 21A:
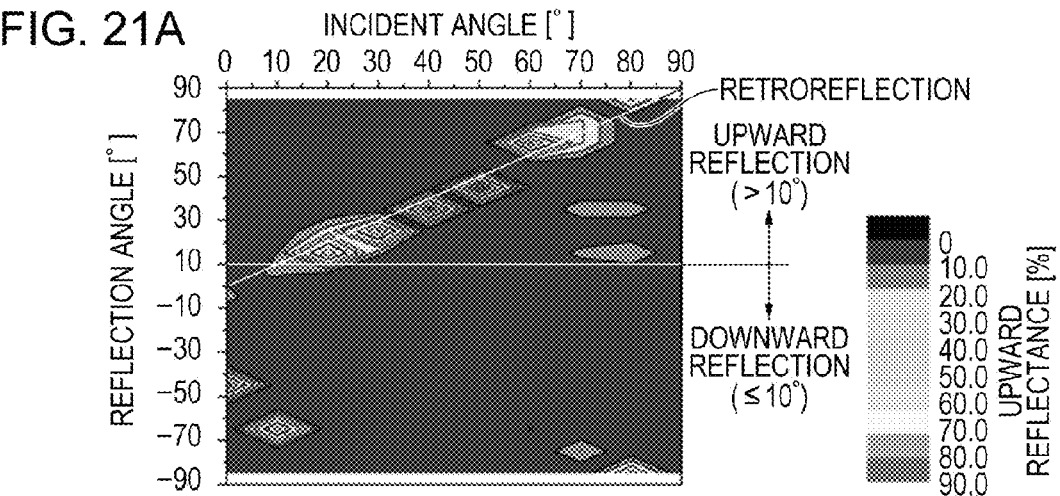
FIG. 21A is a plot illustrating the calculation result of reflectance through a simulation in TEST EXAMPLE 2.
Figure 21B:
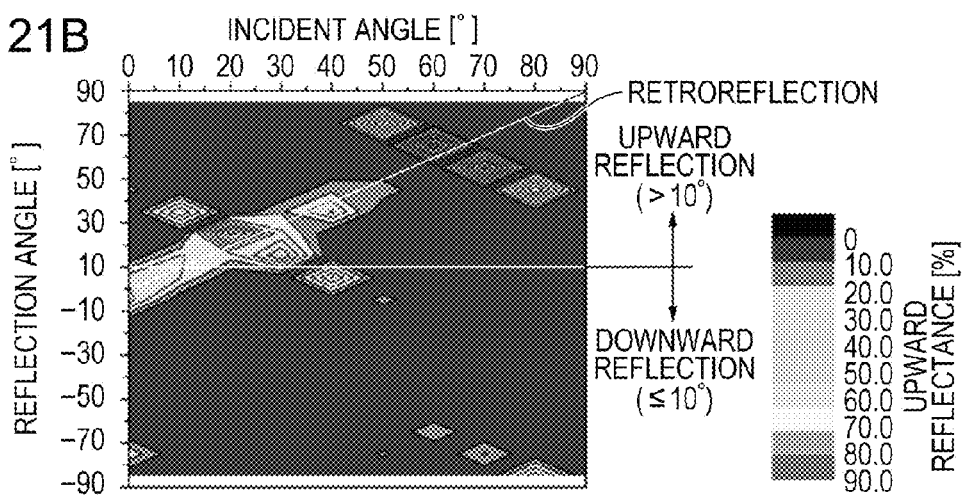
FIG. 21B is a plot illustrating the calculation result of reflectance through a simulation in TEST EXAMPLE 3.
Figure 21C:
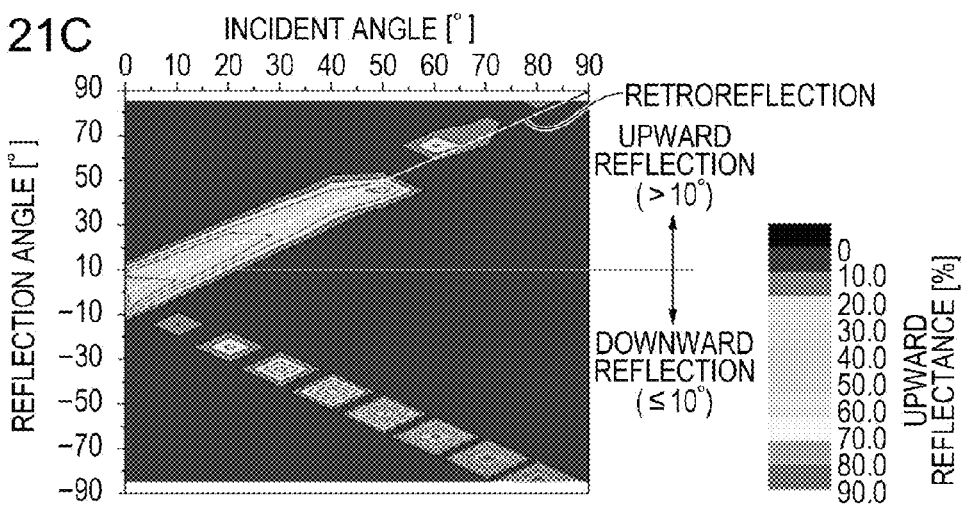
FIG. 21C is a plot illustrating the calculation result of reflectance through a simulation in TEST EXAMPLE 4.

Type of prism pattern: prism pattern 3
Type of reflecting layer: totally reflecting layer
Film thickness: film thickness d1 on the upper sloped surface and film thickness d2 on the lower sloped surface are constant The following points are understood from FIGS. 21A to 21C.

In TEST EXAMPLES 2 to 4, the incident light is retroreflected upward. More specifically, however, a proportion of the retroreflection can be increased in TEST EXAMPLES 2 and 3 where the directional reflecting surface is formed by the asymmetrical triangular pillars in comparison with that in TEST EXAMPLE 4 where the directional reflecting surface is formed by the symmetrical triangular pillars.

Thus, in TEST EXAMPLE 4 where the directional reflecting surface is formed by the symmetrical triangular pillars, a downward reflectance is increased in comparison with those in TEST EXAMPLES 2 and 3 where the directional reflecting surface is formed by the asymmetrical triangular pillars.

2-2. Measurement with actual samples

Example 1

First, an array of grooves each having a two-dimensional shape in cross-section reversed to that of the triangular pillar, illustrated in FIG. 19A, was formed on a Ni-P-made die by cutting with a byte. Next, a mixed resin (trade name DPHA made by NIPPON KAYAKU Co., Ltd.) of dipentaerythritol hexaacrylate and dipentaerythritol pentaacrylate was coated over the Ni-P-made die, and a PET film (A4300 made by Toyobo Co., Ltd.) having a thickness of 75 μm was placed on the mixed resin. Next, the mixed resin was irradiated with UV light from the side including the PET film to cure the mixed resin.

Next, a laminate of the resin and the PET film was peeled off from the Ni-P-made die, thereby obtaining a resin layer (first optical layer) having a shaped surface, on which the plural triangular pillars, each as illustrated in FIG. 19A, were arrayed in a one-dimensional pattern. Next, an AlTi layer (target composition: Al/Ti=98.5 at %/1.5 at %), serving as the totally reflecting layer, was formed in a thickness of 100 nm on the shaped surface of the resin layer by vacuum sputtering.

Next, the above-mentioned mixed resin was coated over an alternating multilayer film (totally reflecting layer) again. After placing a PET film on the mixed resin and purging out bubbles, the mixed resin was cured by irradiation with UV light to form a resin layer (second optical layer) on the alternating multilayer film. As a result, an objective directional reflector in the form of an optical film was obtained.

Example 2

An optical film was obtained in a similar manner to that in EXAMPLE 1 except for that an array of grooves each having a two-dimensional shape in cross-section reversed to that of the triangular pillar, illustrated in FIG. 19B, was formed on a Ni-P-made die by cutting with a byte.

Reflection Distribution

Figure 22A:
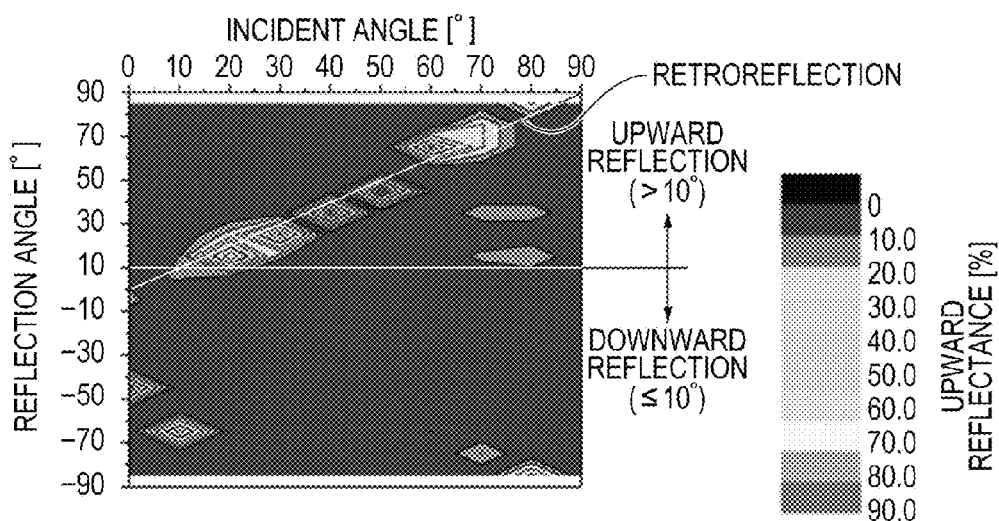
FIG. 22A is a plot illustrating the calculation result of reflectance through a simulation in TEST EXAMPLE 2.
Figure 22B:
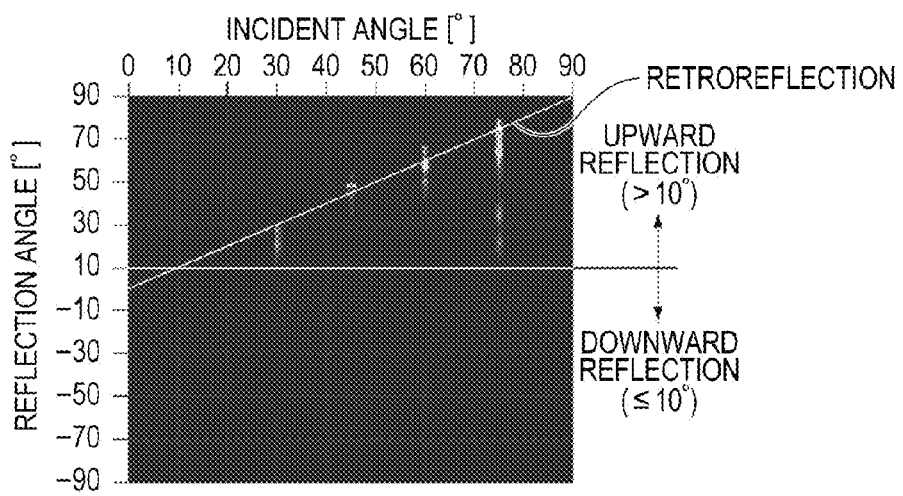
FIG. 22B is a plot illustrating the measurement result of reflectance of an optical film of EXAMPLE 1.
Figure 23A:
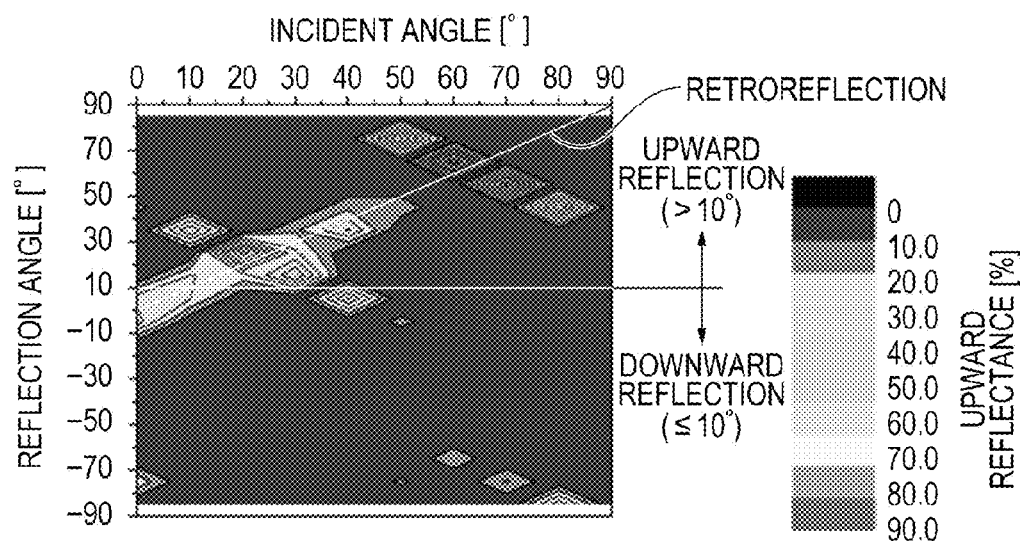
FIG. 23A is a plot illustrating the calculation result of reflectance through a simulation in TEST EXAMPLE 3.
Figure 23B:
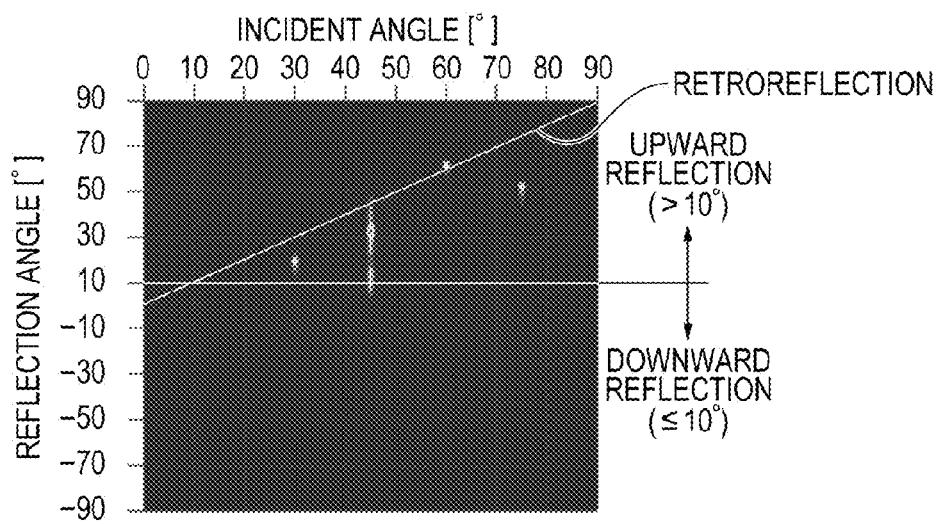
FIG. 23B is a plot illustrating the measurement result of reflectance of an optical film of EXAMPLE 2.

A reflection distribution was measured for each of incident angles 15°, 30°, 45°, 60° and 75° by using a spectroscopic GONIO photometer made by Lambda Vision Inc. The measurement results are plotted in FIGS. 22B and 23B. Note that FIGS. 22A and 23A plot the calculation results (calculation results in TEST EXAMPLES 2 and 3) through simulations performed under the same setting conditions as those for the directional reflecting surfaces in EXAMPLES 1 and 2.

As seen from FIGS. 22A to 23B, the measurement results of the upward reflectance in EXAMPLES 1 and 2 obtained by using the actual samples have a similar tendency to the calculation results in TEST EXAMPLES 2 and 3 obtained by performing the simulations.

3. Relationship of slope angle versus film thickness of wavelength-selective reflecting layer Reference Example 1

First, an array of grooves each having a two-dimensional shape in cross-section reversed to that of the triangular pillar, illustrated in FIG. 19A, was formed on a Ni-P-made die by cutting with a byte. Next, a mixed resin (trade name DPHA made by NIPPON KAYAKU Co., Ltd.) of dipentaerythritol hexaacrylate and dipentaerythritol pentaacrylate was coated over the Ni-P-made die, and a PET film (A4300 made by Toyobo Co., Ltd.) having a thickness of 75 µm was placed on the mixed resin. Next, the mixed resin was irradiated with UV light from the side including the PET film to cure the mixed resin.

Next, a laminate of the resin and the PET film was peeled off from the Ni-P-made die, thereby obtaining a resin layer (first optical layer) having a shaped surface, on which the plural triangular pillars, each illustrated in FIG. 19A, were arrayed in a one-dimensional pattern. Next, a multilayer film made up of the following layers was formed on the shaped surface of the resin layer by vacuum sputtering. As a result, an objective directional reflector in the form of an optical film was obtained.

First layer: GAZO layer
Second layer: AgNdCu layer
Third layer: GAZO layer
Fourth layer: AgNdCu layer
Fifth layer: GAZO layer Reference Example 2

An optical film was obtained in a similar manner to that in REFERENCE EXAMPLE 1 except for that an array of grooves each having a two-dimensional shape in cross-section reversed to that of the triangular pillar, illustrated in FIG. 19B, was formed on a Ni-P-made die by cutting with a byte.

Reference Example 3

An optical film was obtained in a similar manner to that in REFERENCE EXAMPLE 1 except for that an array of grooves each having a two-dimensional shape in cross-section reversed to that of the triangular pillar, illustrated in FIG. 19C, was formed on a Ni-P-made die by cutting with a byte.

Reference Example 4

Figure 24A:
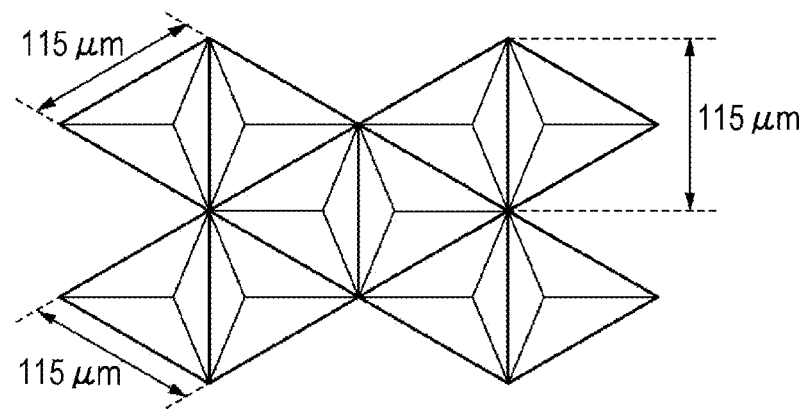
FIG. 24A is a plan view illustrating a corner cube shape of a master that is used to fabricate an optical film of COMPARATIVE EXAMPLE 2.
Figure 24B:
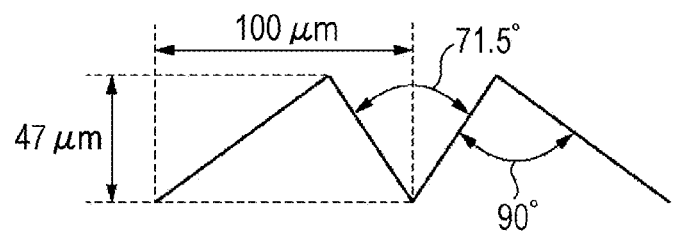
FIGS. 24B and 24C are each a side view illustrating the corner cube shape of the master that is used to fabricate the optical film of COMPARATIVE EXAMPLE 2.
Figure 24C:
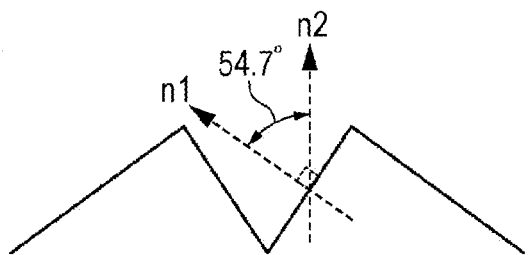

First, an array of corner cubes, illustrated in FIGS. 24A to 24C, was formed on a Ni-P-made die by cutting with a byte. Next, urethane acrylate (ARONIX made by TOAGOSEI CO., LTD., refractive index of 1.533 after being cured) was coated over the Ni-P-made die, and a PET film (A4300 made by Toyobo Co., Ltd.) having a thickness of 75 µm was placed on the coated resin. Next, the coated resin was irradiated with UV light from the side including the PET film to cure the coated resin.

Next, a laminate of the resin and the PET film was peeled off from the Ni-P-made die, thereby obtaining a resin layer (first optical layer) having a shaped surface, on which many corner cubes were two-dimensionally arrayed. Next, a multilayer film was formed on the shaped surface of the resin layer by vacuum sputtering under the same film forming conditions as those in REFERENCE EXAMPLE 1. As a result, an objective directional reflector in the form of an optical film was obtained.

Method of Measuring Film Thickness

Figure 25A:
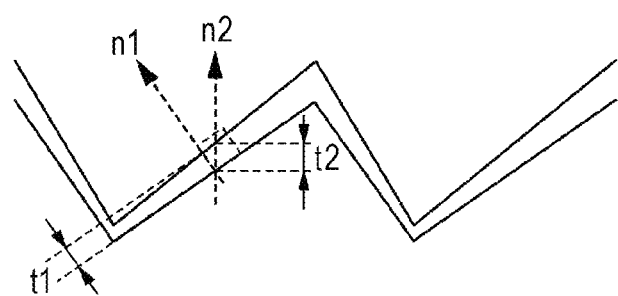
FIG. 25A is an illustration to explain a method of measuring a mean film thickness of each layer in a multilayer film of a wavelength-selective reflecting layer in each of REFERENCE EXAMPLES 1 to 3.

FIG. 25A is an illustration to explain a method of measuring a mean film thickness of each layer in the multilayer film of the wavelength-selective reflecting layer in REFERENCE EXAMPLES 1 to 3.

The mean film thickness of each layer in the multilayer film of the wavelength-selective reflecting layer in REFERENCE EXAMPLES 1 to 3 was measured as follows. First, the optical film was cut in a direction perpendicular to the ridgeline of the triangular pillar by using an FIB (Focused Ion Beam) to form a cross-section. Then, a film thickness t2 of each layer in a direction n2 was measured at a midpoint of each of two sides forming a triangular shape of the cross-section by using a TEM (Transmission Electron Microscope). The measurement was repeated at arbitrary 10 points on the optical film, and measured values were simply averaged (arithmetically averaged), thereby obtaining the mean film thickness. The reason why the film thickness is measured by specifying the measurement positions as described above resides in that, when the film thickness of the wavelength-selective reflecting layer formed on the triangular pillar is measured, it differs depending on a position on the sloped surface of the triangular pillar as illustrated in FIG. 25A. In FIG. 25A, n1 and n2 represent the following directions:

Direction n1: direction perpendicular to the sloped surface of the triangular pillar formed in the PET film Direction n2: direction perpendicular to the principal surface of the PET film (i.e., direction of thickness of the PET film)

Figure 25B:
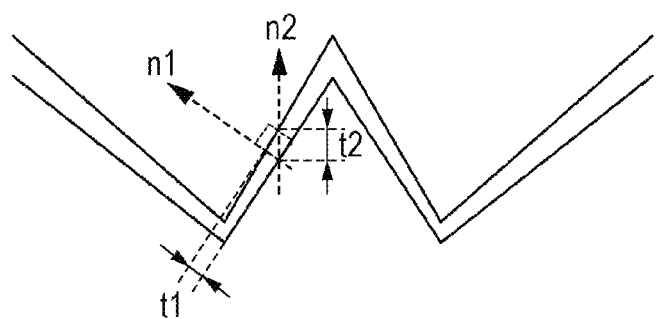
FIG. 25B is an illustration to explain a method of measuring a mean film thickness of each layer in a multilayer film of a wavelength-selective reflecting layer in REFERENCE EXAMPLE 4.

FIG. 25B is an illustration to explain a method of measuring a mean film thickness of each layer in the multilayer film of the wavelength-selective reflecting layer in REFERENCE EXAMPLE 4.

The mean film thickness of each layer in the multilayer film of the wavelength-selective reflecting layer in REFERENCE EXAMPLE 4 was measured as follows. First, the optical film was cut along a plane including one of sides forming the corner cube by using an FIB to form a cross-section. Then, a film thickness t2 of each layer in a direction n2 was measured at a midpoint of a perpendicular line with respect to a triangle forming the corner cube by using a TEM. The measurement was repeated at arbitrary 10 points on the optical film, and measured values were simply averaged (arithmetically averaged), thereby obtaining the mean film thickness. Herein, the term "perpendicular line with respect to a triangle" implies a perpendicular line that is drawn from the apex of a triangle, which forms a pyramidal surface of a triangular pyramid, to a subtense (i.e., a bottom side of the triangle). The reason why the film thickness is measured by specifying the measurement positions as described above resides in that, when the film thickness of the wavelength-selective reflecting layer formed on the corner cube is measured, it differs depending on a position on the triangle forming the corner cube as illustrated in FIG. 25B. In FIG. 25B, n1 and n2 represent the following directions:

Direction n1: direction perpendicular to the sloped surface of the corner cube formed in the PET film Direction n2: direction perpendicular to the principal surface of the PET film (i.e., direction of thickness of the PET film)

Figure 26A:
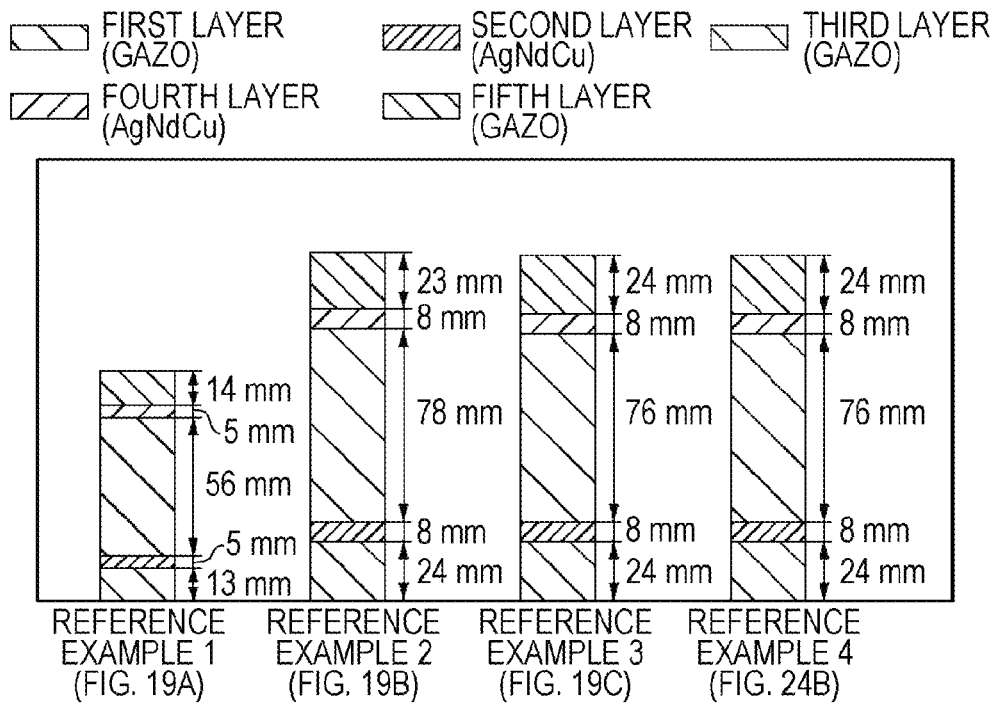
FIG. 26A illustrates film thicknesses of the layers in the multilayer film of the wavelength-selective reflecting layer formed on an upward sloped surface in each of REFERENCE EXAMPLES 1 to 4.
Figure 26B:
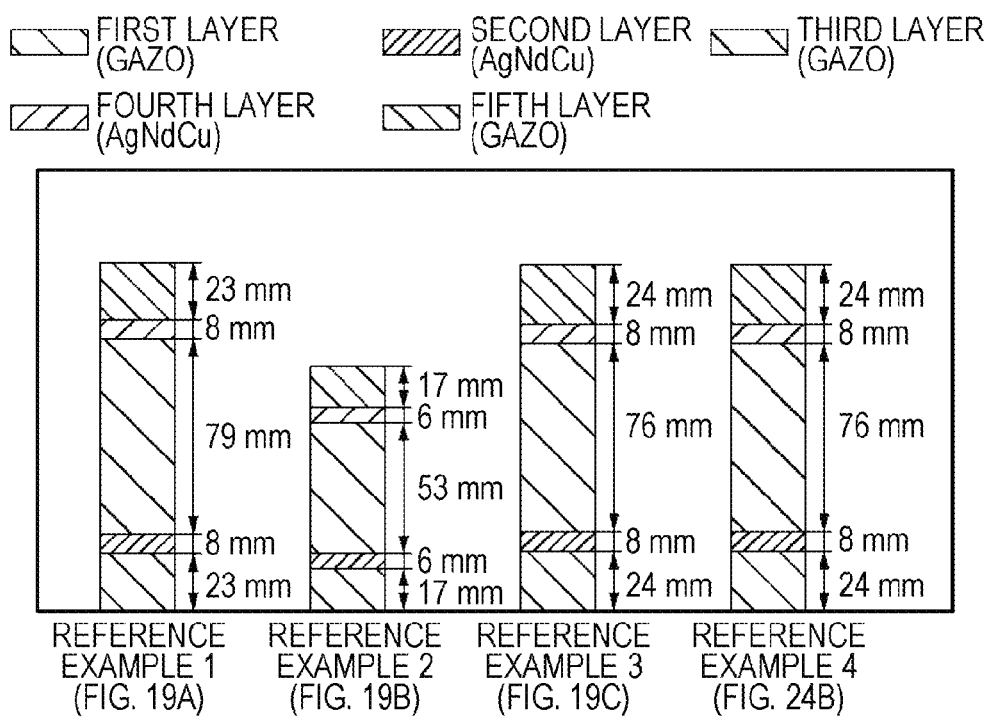
FIG. 26B illustrates film thicknesses of the layers in the multilayer film of the wavelength-selective reflecting layer formed on a downward sloped surface in each of REFERENCE EXAMPLES 1 to 4.

FIG. 26A illustrates film thicknesses (film thicknesses d1 on the upward sloped surface) of the layers in the multilayer film of the wavelength-selective reflecting layer formed on the upward sloped surface Sp1 (see FIG. 18) in each of REFERENCE EXAMPLES 1 to 4, and FIG. 26B illustrates film thicknesses (film thicknesses d2 on the downward sloped surface) of the layers in the multilayer film of the wavelength-selective reflecting layer formed on the downward sloped surface Sp2 (see FIG. 18) in each of REFERENCE EXAMPLES 1 to 4.

The following points are understood from FIGS. 26A and 26B.

In REFERENCE EXAMPLES 1 and 2 in which the directional reflecting surface is formed by the asymmetrical triangular pillars, the film thickness of the wavelength-selective reflecting layer on the upper reflecting layer Sp1 or the lower reflecting layer Sp2 can be reduced.

On the other hand, in REFERENCE EXAMPLE 3 in which the directional reflecting surface is formed by the symmetrical triangular pillars, the film thicknesses of the wavelength-selective reflecting layers on both the upper reflecting surface and the lower reflecting surface are increased in total. Further, in REFERENCE EXAMPLE 4 in which the directional reflecting layer is formed by the corner cubes, the film thickness of the wavelength-selective reflecting layer is relatively large on each of three triangular surfaces forming the corner cube.

Thus, when the directional reflecting surface is formed by the asymmetrical triangular pillars, the film thickness of the wavelength-selective reflecting layer can be reduced in entirety as compared with that when the directional reflecting surface is formed by the symmetrical triangular pillars or the corner cubes. Consequently, the optical film can be manufactured at a lower cost.

4. Relationship of wavelength versus upward reflectance

Test Example 5

An upward reflectance was determined through a simulation performed as described below by using the illumination design analysis software "Light Tools" available from ORA.

Figure 27A:
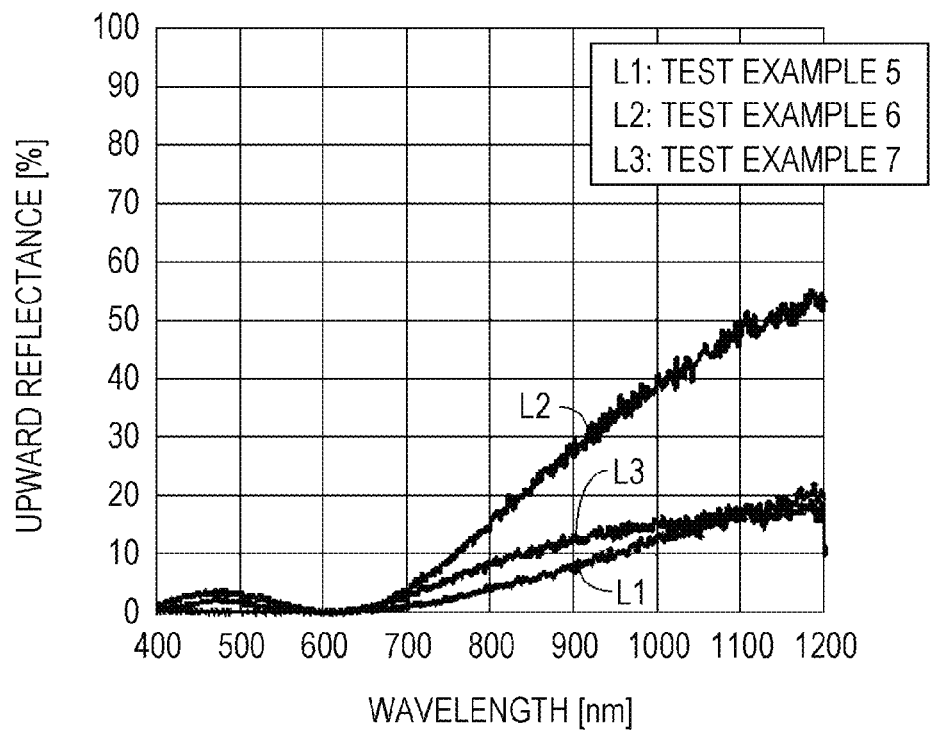
FIG. 27A is a graph illustrating the calculation results of upward reflectance through simulations in TEST EXAMPLES 5 to 7.

First, a directional reflecting surface having the following setting conditions was set:
Type of prism pattern: prism pattern 1
Type of reflecting layer: totally reflecting layer
Film thickness: film thickness dl on the upper sloped surface and film thickness d2 on the lower sloped surface are constant Next, an imaginary sunlight source (color temperature of 6500K and wavelengths of 380 to 1200 nm) was set as a light source P, and an upward reflectance was determined in the above-mentioned range of wavelengths by causing light to be incident on the directional reflecting surface from the direction of the incident angle (θ0, φ)=(60°, 0°). The measurement result is plotted in FIG. 27A.

Test Example 6

An upward reflectance was determined in the above-mentioned range of wavelengths in a similar manner to that in TEST EXAMPLE 5 except for modifying the setting conditions of the directional reflecting surface as follows. The measurement result is plotted in FIG. 27A.
Type of prism pattern: prism pattern 2
Type of reflecting layer: totally reflecting layer
Film thickness: film thickness dl on the upper sloped surface and film thickness d2 on the lower sloped surface are constant Test Example 7

An upward reflectance was determined in the above-mentioned range of wavelengths in a similar manner to that in TEST EXAMPLE 5 except for modifying the setting conditions of the directional reflecting surface as follows. The measurement result is plotted in FIG. 27A.
Type of prism pattern: prism pattern 3
Type of reflecting layer: totally reflecting layer
Film thickness: film thickness d1 on the upper sloped surface and film thickness d2 on the lower sloped surface are constant The following points are understood from FIGS. 27A to 27C.

In TEST EXAMPLES 5 to 7 in which the direction reflecting surface is formed by the triangular pillars, the upward reflectance depends on wavelength, and it tends to increase when the wavelength exceeds about 650 nm. The increasing tendency of the upward reflectance is significantly larger in TEST EXAMPLE 6.

Test Example 8

An upward reflectance was determined in the above-mentioned range of wavelengths in a similar manner to that in TEST EXAMPLE 5 except for causing light to be incident on the directional reflecting surface from the direction of the incident angle ($\theta_0$, φ)=(40°, 0°) and (60°,0°). The measurement result is plotted in FIG. 27B.

Figure 27B:
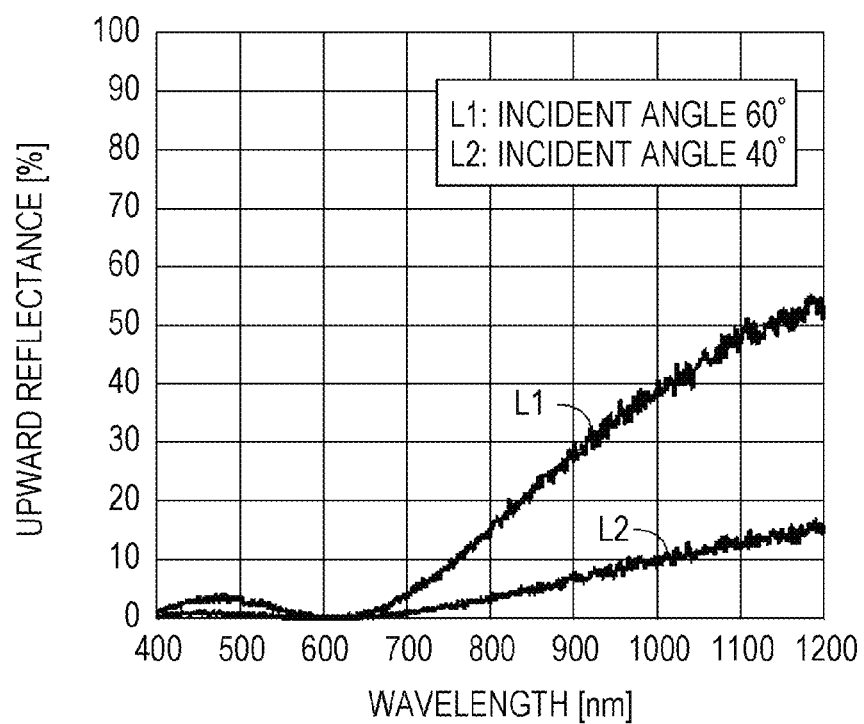
FIG. 27B is a graph illustrating the calculation result of upward reflectance through a simulation in TEST EXAMPLE 8.

The following points are understood from FIG. 27B.

The upward reflectance is lower at the incident angle ($\theta_0$, φ)=(40°,0°) than at the incident angle ($\theta_0$, φ)=(60°,0°). In other words, an increase in the upward reflectance in a longer wavelength band is reduced at a smaller incident angle $\theta_0$.

5. Relationship of incident angle versus upward reflectance

Test Example 9

An upward reflectance was determined through a simulation performed as described below by using the illumination design analysis software "Light Tools" available from ORA.

First, a directional reflecting surface having the following setting conditions was set:
Type of prism pattern: prism pattern 2
Type of reflecting layer: totally reflecting layer
Film thickness: film thickness dl on the upper sloped surface and film thickness d2 on the lower sloped surface are constant Next, an imaginary sunlight source (color temperature of 6500K and wavelengths of 380 to 1200 nm) was set as a light source P, and an upward reflectance was determined by causing light to be incident on the directional reflecting surface from the direction over a range of the incident angle (θ0, φ)=(0°,0°) to (80°,0°). The measurement result is plotted in FIG. 28A.

Test Example 10

An upward reflectance was determined in a similar manner to that in TEST EXAMPLE 9 except for modifying the type of the reflecting layer to the wavelength-selective reflecting layer. The measurement result is plotted in FIG. 28A.

Figure 28A:
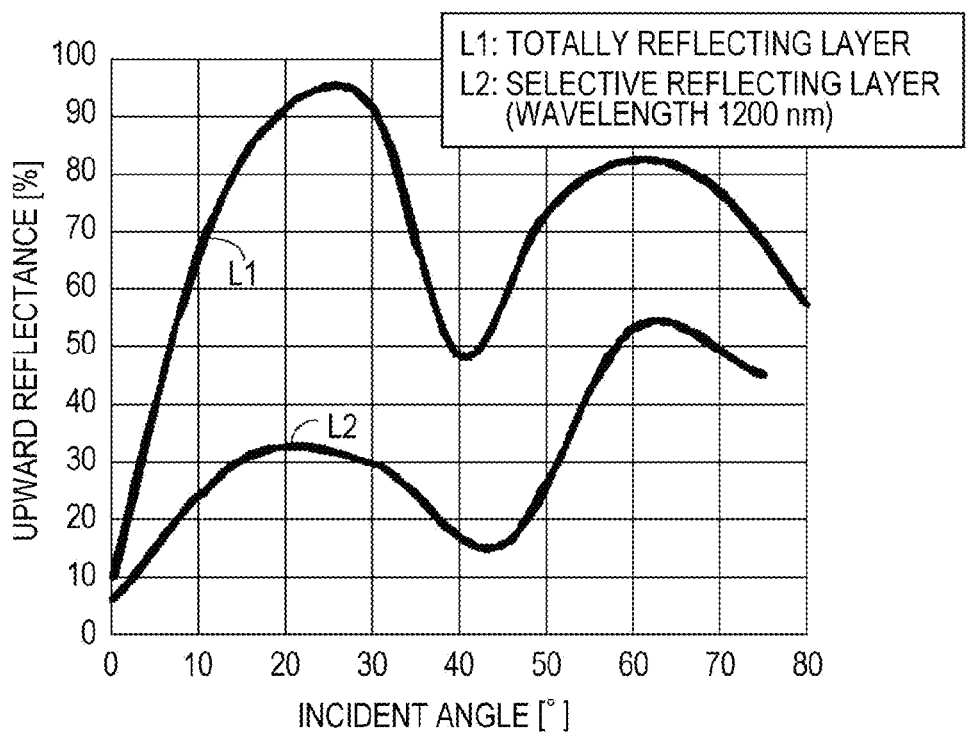
FIG. 28A is a graph illustrating the calculation results of upward reflectance through simulations in TEST EXAMPLES 9 and 10.

As seen from FIG. 28A, there is a similar tendency in dependence of the upward reflectance on the incident angle between when the reflecting layer is the wavelength-selective reflecting layer and when the reflecting layer is the totally reflecting layer. In other words, the upward reflectance tends to partly drop in a certain angle range about 40° regardless of which type of the reflecting layer is used.

6. Relationship of wavelength and incident angle versus upward reflectance

Test Example 11

An upward reflectance was determined through a simulation performed as described below by using the illumination design analysis software "Light Tools" available from ORA.

First, a directional reflecting surface having the following setting conditions was set:

Type of prism pattern: prism pattern 2
Type of reflecting layer: wavelength-selective reflecting layer
Film thickness: film thickness dl on the upper sloped surface and film thickness d2 on the lower sloped surface are constant Next, an imaginary sunlight source (color temperature of 6500K and wavelengths of 380 to 1200 nm) was set as a light source P, and an upward reflectance was determined by causing light to be incident on the directional reflecting surface from the direction over a range of the incident angle ($\theta 0$, $\phi$)=(0°,0°) to (80°, 0°). The measurement result is plotted in FIG. 28B.

Figure 28B:
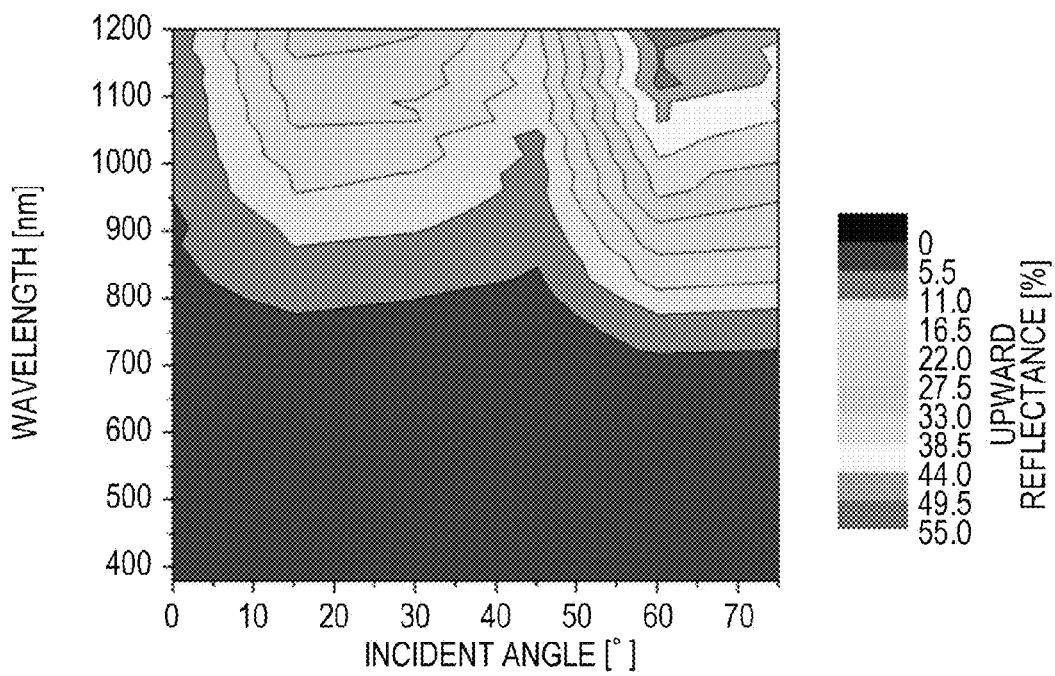
FIG. 28B is a graph illustrating the calculation result of upward reflectance through a simulation in TEST EXAMPLE 11.

As seen from FIG. 28B, there is a peak of the upward reflectance about the incident angle of 60° in a wavelength band of 1100 to 1200 nm.

To summarize the above-described results, the following points are understood regarding the prism patterns 1 to 3.

Because of having the asymmetrical shape, the prism pattern 1 has a large difference in film thickness between two sloped surfaces. The upward reflectance obtained with the prism pattern 1 tends to become smaller than that obtained with the prism pattern 2. When the totally reflecting layer is used as the reflecting layer, the prism pattern 1 is preferably used as the type of the prism pattern.

The prism pattern 2 also has the asymmetrical shape, but it has a smaller difference in film thickness between two sloped surfaces than that in the prism pattern 1. The upward reflectance obtained with the prism pattern 2 can be increased to 50% or higher in the infrared range (i.e., in the range of not shorter than about 1150 nm).

Because of having the symmetrical shape, the prism pattern 3 has no difference in film thickness between the two sloped surfaces. In the case using the prism pattern 3, the reflection performance with the totally reflecting layer is low, and a high upward reflectance is not obtained even with the wavelength-selective reflecting layer.

While the embodiments of the present technology have been described in detail above, the present technology is not limited to the above-described embodiments and can be variously modified on the basis of the technical concept of the present technology.

For example, the constructions (configurations), the methods, the shapes, the materials, the numerical values, etc. explained in the foregoing embodiments are merely mentioned for illustrative purpose, and different constructions (configurations), methods, shapes, materials, numerical values, etc. can also be used when necessary.

Also, the constructions (configurations) in the above-described embodiments can be selectively combined with each other without departing from the scope of the present technology.

While the foregoing embodiments have been described, by way of example, in connection with the case where the window blind and the rolling screen device are manually operated, the window blind and the rolling screen device may be electrically operated.

The foregoing embodiments have been described, by way of example, in connection with the case where the optical film is affixed to the adherend, such as the wall member. However, the adherend, such as the wall member, may be constituted as the first optical layer or the second optical layer itself of the optical film. That modification enables the adherend, such as the wall member, to have the directional reflection function in advance.

While the foregoing embodiments have been described, by way of example, in connection with the case where the optical body is the optical film, the shape of the optical body is not limited to a film, and the optical body may have a plate- or block-like shape.

While the foregoing embodiments have been described, by way of example, in connection with the case of applying the present technology to the interior or exterior members, such as the wall member, the fitting, the slat of the window blind, and the screen of the rolling screen device, application examples of the present technology are not limited to the illustrated ones, and embodiments of the present technology are further applicable to other interior and exterior members than the above-described ones.

While the foregoing embodiments have been described, by way of example, in connection with the case of applying the present technology to the window blind and the rolling screen device, application examples of the present technology are not limited to the illustrated ones, and embodiments of the present technology are further applicable to various types of solar shading devices installed on the indoor or outdoor side.

While the foregoing embodiments have been described, by way of example, in connection with the case of applying the present technology to the solar shading device (e.g., the rolling screen device) where a degree at which the solar shading member cuts off the incident light can be adjusted by taking up or letting out the solar shading member, application examples of the present technology are not limited to the illustrated one. For example, embodiments of the present technology are further applicable to a solar shading device where a degree at which a solar shading member cuts off the incident light can be adjusted by folding or unfolding the solar shading member. One example of such a solar shading device is a pleated screen device where a degree at which a solar shading member cuts off the incident light can be adjusted by folding or unfolding a screen as the solar shading member in the form of bellows.

While the foregoing embodiments have been described, by way of example, in connection with the case of applying the present technology to a horizontal-type window blind (Venetian window blind), embodiments of the present technology are further applicable to a vertical-type window blind.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An optical body comprising:
   a substrate having a concave-convex surface;
   a reflecting layer formed on the concave-convex surface; and
   an optical layer formed on the reflecting layer to embed the concave-convex surface, wherein the reflecting layer directionally reflects all of the incident light regardless of the wavelength band, the concave-convex surface is made up of a plurality of triangular pillars arrayed in a one-dimensional pattern, and the triangular pillar has an apex angle $\alpha$ and a slope angle $\beta$, the apex angle $\alpha$ and the slope angle $\beta$ being within an area bounded by lines defined by the following formulae:

$\beta=4.5\alpha-285$ (where $70\leq\alpha\leq 80$)

$\beta=-1.5\alpha+195$ (where $80\leq\alpha\leq 100$) and $\beta=30$.

2. An optical body comprising:

a substrate having a concave-convex surface; and a reflecting layer formed on the concave-convex surface, wherein the reflecting layer directionally reflects all of the incident light regardless of the wavelength band, the concave-convex surface is made up of a plurality of triangular pillars arrayed in a one-dimensional pattern, and the triangular pillar has an apex angle $\alpha$ and a slope angle $\beta$, the apex angle $\alpha$ and the slope angle $\beta$ being within an area bounded by lines defined by the following formulae:

$\beta=4.5\alpha-285$ (where $70\leq\alpha\leq 80$)

$\beta=-1.5\alpha+195$ (where $80\leq\alpha\leq 100$) and $\beta=30$.

3. The optical body according to claim 1, wherein the apex angle $\alpha$ and the slope angle $\beta$ are within an area bounded by lines defined by the following formulae:

$\beta=\alpha-40$ (where $70\leq\alpha\leq 80$)

$\beta\leq-\alpha+150$ (where $80\leq\alpha\leq 100$) and $\beta=30$.

4. The optical body according to claim 1, wherein the triangular pillar has a first sloped surface and a second sloped surface on each of which the reflecting layer is formed, and film thicknesses of the reflecting layers formed on the first sloped surface and the second sloped surface differ from each other.

5. The optical body according to claim 1, wherein the triangular pillar has a first sloped surface and a second sloped surface on each of which the reflecting layer is formed, and film thicknesses of the reflecting layers formed on the first sloped surface and the second sloped surface are substantially equal to each other.

6. The optical body according to claim 1, wherein the triangular pillars are arrayed at a pitch of 5 μm or larger and 5 mm or smaller.

7. The optical body according to claim 1, wherein the reflecting layer is a metal layer.

8. The optical body according to claim 7, wherein the reflecting layer has a reflectance of 30% or more at a wavelength of 1500 nm.

9. The optical body according to claim 1, further comprising a water-repellent or hydrophilic layer on an incident surface of the optical body.

10. The optical body according to claim 2, further comprising a protective layer formed on the reflecting layer to follow the concave-convex surface.

11. The optical body according to claim 1, wherein the optical body has a belt-like or rectangular shape, and a lengthwise direction of the optical body is orthogonal to a ridgeline direction of the triangular pillar.

12. A wall member including the optical body according to claim 1.

13. The wall member according to claim 12, wherein the optical body is arranged such that a ridgeline direction of the triangular pillar is substantially orthogonal to a direction of height of a building.

14. The wall member according to claim 12, wherein the optical body is arranged such that, in each of the triangular pillars, the slope angle $\beta$ is positioned above the apex angle $\alpha$.

15. A fitting including a shading portion provided with the optical body according to claim 1.

16. A solar shading device comprising one or more solar shading members to cut off sunlight, wherein the solar shading member includes the optical body according to claim 1.

17. A building including the optical body according to claim 1, wherein the optical body is arranged such that, in each of the triangular pillars, the slope angle $\beta$ is positioned above the apex angle $\alpha$.

\* \* \* \* \*